US012656918B2

(12) United States Patent　　　　　(10) Patent No.:　US 12,656,918 B2
Yan et al.　　　　　　　　　　　　　　　(45) Date of Patent:　Jun. 16, 2026

(54) DISPLAY APPARATUS AND TOUCH STRUCTURE

(71) Applicants:Chengdu BOE Optoelectronics Technology Co., Ltd., Chengdu (CN); BOE Technology Group Co., Ltd., Beijing (CN)

(72) Inventors: Jun Yan, Beijing (CN); Xiangdan Dong, Beijing (CN); Jaeseung Kim, Beijing (CN); Haijun Qiu, Beijing (CN); Ming Hu, Beijing (CN); Fan He, Beijing (CN); Kemeng Tong, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/852,876

(22) PCT Filed: Aug. 8, 2023

(86) PCT No.: PCT/CN2023/111695
§ 371 (c)(1),
(2) Date: Sep. 30, 2024

(87) PCT Pub. No.: WO2024/032593
PCT Pub. Date: Feb. 15, 2024

(65) Prior Publication Data
US 2025/0231648 A1　　Jul. 17, 2025

(30) Foreign Application Priority Data
Aug. 10, 2022　(CN) ......................... 202210956632.X

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/0448* (2019.05)

(58) Field of Classification Search
CPC ... G06F 3/0446; G06F 3/04164; G06F 3/0448
(Continued)

(56) References Cited

U.S. PATENT DOCUMENTS

2016/0282993 A1* 9/2016 Song ...................... G06F 3/0446
2017/0090644 A1* 3/2017 Yao ......................... H10K 59/40
(Continued)

FOREIGN PATENT DOCUMENTS

CN　　104932733 A　　9/2015
CN　　110178106 A　　8/2019
(Continued)

OTHER PUBLICATIONS

International Search Report and Written Opinion mailed on Oct. 25, 2023, received for PCT Application No. PCT/CN2023/111695, filed on Aug. 8, 2023, 22 pages including English Translation.

*Primary Examiner* — Mark Edwards
(74) *Attorney, Agent, or Firm* — XSENSUS LLP

(57) ABSTRACT

A display apparatus includes a plurality of first touch channels, second touch channels, first touch traces, second touch traces, and a first touch chip and second touch chip. At least one first touch channel and second touch channel are arranged in each sub-region, and the at least one first touch channel and second touch channel are arranged crosswise and insulated from each other; first touch channels located in different sub-regions are insulated from each other, and second touch channels located in different sub-regions are insulated from each other. In any two sub-regions, first touch (Continued)

traces connected to first touch channels and second touch traces connected to second touch channels are connected to the first touch chip; in remaining two sub-regions except the any two sub-regions, first touch traces connected to first touch traces connected to first touch channels and second touch traces connected to second touch channels are connected to the second touch chip.

19 Claims, 22 Drawing Sheets

(58) Field of Classification Search
USPC ........................................................ 345/173
See application file for complete search history.

(56) References Cited

U.S. PATENT DOCUMENTS

| | | | | |
|---|---|---|---|---|
| 2019/0179451 A1* | 6/2019 | Kim | ......................... | G06F 3/044 |
| 2022/0398012 A1* | 12/2022 | Gray | ................... | G06F 3/04186 |
| 2023/0118885 A1* | 4/2023 | Rhe | ...................... | G06F 3/0412 |
| | | | | 345/173 |
| 2024/0192820 A1* | 6/2024 | Zhang | ..................... | G06F 3/041 |
| 2024/0310950 A1* | 9/2024 | Mo | ..................... | G06F 3/04164 |

FOREIGN PATENT DOCUMENTS

| | | | | | |
|---|---|---|---|---|---|
| CN | 110471568 | A | | 11/2019 | |
| CN | 112764590 | A | | 5/2021 | |
| CN | 112860110 | A | | 5/2021 | |
| CN | 113485576 | A | | 10/2021 | |
| CN | 216388033 | U | * | 4/2022 | |
| CN | 115268698 | A | | 11/2022 | |
| CN | 218273359 | U | | 1/2023 | |
| KR | 20170055862 | A | | 5/2017 | |
| KR | 20230102898 | A | * | 7/2023 | ............. G06F 3/044 |

* cited by examiner

C

Tx

Rx

GL

G

Q1

Tx

Rx

B1/1

Y

X

DISPLAY APPARATUS AND TOUCH STRUCTURE

CROSS-REFERENCE TO RELATED APPLICATIONS

This application is a national phase entry under 35 USC 371 of International Patent Application No. PCT/CN2023/111695, filed on Aug. 8, 2023, which claims priority to Chinese Patent Application No. 202210956632.X, filed on Aug. 10, 2022, each are incorporated herein by reference in their entirety.

TECHNICAL FIELD

The present disclosure relates to the field of display technologies, and in particular, to a display apparatus and a touch structure.

BACKGROUND

With the continuous development of electronic products, display apparatuses with touch functions and display functions may realize simple and flexible human-computer interaction and are therefore widely used.

Active matrix organic light-emitting diode (AMOLED) display apparatuses may achieve full-screen, narrow bezel, high resolution, rollable wear, and folding, and have become an important development direction in the field of display technologies.

SUMMARY

In an aspect, a display apparatus is provided. The display apparatus includes a touch region, and a fan-out region, a first peripheral region, a second peripheral region and a third peripheral region that surrounding the touch region. The first peripheral region and the second peripheral region are respectively located on two sides of the touch region in a first direction, and the fan-out region and the third peripheral region are respectively located on two sides of the touch region in a second direction. The first direction and the second direction intersect with each other. The touch region includes a first sub-region, a second sub-region, a third sub-region and a fourth sub-region, the first sub-region and the second sub-region are arranged in the first direction, and the first sub-region and the third sub-region are arranged in the second direction, and the third sub-region and the fourth sub-region are arranged in the first direction.

The display apparatus includes a plurality of first touch channels and a plurality of second touch channels, a plurality of first touch traces, a plurality of second touch traces, and a first touch chip and a second touch chip. Each first touch channel includes a plurality of first touch electrodes arranged in the first direction and connected in series, and each second touch channel includes a plurality of second touch electrodes arranged in the second direction and connected in series. At least one first touch channel and at least one second touch channel are arranged in each sub-region, and the at least one first touch channel and the at least one second touch channel are arranged crosswise and insulated from each other. First touch channels located in different sub-regions are insulated from each other, and second touch channels located in different sub-regions are insulated from each other.

The plurality of first touch traces are electrically connected to the plurality of first touch channels. First touch traces connected to first touch channels in the first sub-region and the third sub-region extend from the first peripheral region to the fan-out region. First touch traces connected to first touch channel in the second sub-region and the fourth sub-region extend from the second peripheral region to the fan-out region. The plurality of second touch traces are electrically connected to the plurality of second touch channels; second touch traces connected to second touch channels in the first sub-region are led out from the third peripheral region and extend to the fan-out region passing through the first peripheral region; second touch traces connected to second touch channels in the second sub-region are led out from the third peripheral region and extend to the fan-out region passing through the second peripheral region; second touch traces electrically connected to second touch channels in the third sub-region and the fourth sub-region directly extend to the fan-out region.

The first touch chip and the second touch chip are provided. In any two sub-regions, first touch traces connected to first touch channels and second touch traces connected to second touch channels are electrically connected to the first touch chip; in remaining two sub-regions except for the any two sub-regions, first touch traces connected to first touch channels and second touch traces connected to second touch channels are electrically connected to the second touch chip.

In some embodiments, dimensions of the first touch channels located in different sub-regions in the first direction are substantially equal, and dimensions of the second touch channels located in different sub-regions in the second direction are substantially equal.

In some embodiments, the first touch channels located in different sub-regions include an equal number of first touch electrodes, and the second touch channels located in different sub-regions include an equal number of second touch electrodes.

In some embodiments, centers of two adjacent first touch channels that are respectively located in the first sub-region and the second sub-region are located substantially on a same straight line extending in the first direction, and centers of two adjacent first touch channels that are respectively located in the third sub-region and the fourth sub-region are located substantially on a same straight line extending in the first direction. Centers of two adjacent second touch channels that are respectively located in the first sub-region and the third sub-region are substantially located on a same straight line extending in the second direction, and centers of two adjacent second touch channels that are respectively located in the second sub-region and the fourth sub-region are substantially on a same straight line extending in the second direction.

In some embodiments, two first touch channels that belong to different sub-regions and are adjacently arranged in the first direction have a gap therebetween, and two second touch channels that belong to different sub-regions and adjacently arranged in the second direction have a gap therebetween, and the gap extends in a shape of zigzag.

In some embodiments, in the first sub-region and the second sub-region, first touch traces connected to first touch channels and second touch traces connected to second touch channels are electrically connected to the first touch chip; in the third sub-region and the fourth sub-region, first touch traces connected to the first touch channels and second touch traces connected to second touch channels are electrically connected to the second touch chip.

In some embodiments, the first touch chip and the second touch chip are both disposed on a side of the fan-out region away from the third peripheral region; in the second direction, the second touch chip is closer to the fan-out region than the first touch chip.

In some embodiments, a part of first touch traces located in the first peripheral region is arranged closer to the touch region than a part of second touch traces located in the first peripheral region; a part of first touch traces located in the second peripheral region is arranged closer to the touch region than a part of second touch traces located in the second peripheral region.

In some embodiments, the display apparatus further includes first dummy electrodes. A first dummy electrode is disposed between an adjacent first touch electrode and second touch electrode and insulated from the first touch electrode and second touch electrode. A border of the first dummy electrode proximate to the first touch electrode and a border of the first dummy electrode proximate to the second touch electrode are both in a shape of zigzag; borders of the first dummy electrode and the first touch electrode that are close to each other match to each other in shape, and borders of the first dummy electrode and the second touch electrode that are close to each other match to each other in shape.

In some embodiments, the first dummy electrode is in a shape of a center symmetric pattern.

In some embodiments, the first dummy electrode is in a shape of a center symmetric pattern, a midpoint of a connection line between a center of the first touch electrode adjacent to the first dummy electrode and a center of the second touch electrode adjacent to the first dummy electrode coincides with a center of the first dummy electrode.

In some embodiments, the first dummy electrode includes a plurality of extension portions connected in sequence, and each extension portion is in a shape of a strip; extension directions of any two adjacent extension portions intersect.

In some embodiments, the first dummy electrode includes a first extension portion, and two second extension portions respectively located at two ends of the first extension portion and connected to the first extension portion; the first extension portion extends substantially in the second direction, and the second extension portions each extend substantially in the first direction.

In some embodiments, the plurality of extension portions have substantially an equal length.

In some embodiments, the first dummy electrode is in a shape of a strip, and a width of the first dummy electrode at different positions in a length direction of the first dummy electrode is substantially equal.

In some embodiments, four first dummy electrodes of all the first dummy electrodes are arranged around the first touch electrode, and the four first dummy electrodes are centrally symmetrically arranged with respect to a center of the first touch electrode; and four first dummy electrodes of all the first dummy electrodes are arranged around the second touch electrode, and the four first dummy electrodes are centrally symmetrically arranged with respect to a center of the second touch electrode.

In some embodiments, the first touch electrode and the second touch electrode each include a main body, two first protruding portions, and two second protruding portions; the main body portion is in a shape of a rectangle, the two first protruding portions are disposed on two sides of the main body portion in the first direction, and the two second protruding portions are disposed on two sides of the main body portion in the second direction; the two first protruding portions and the two second protruding portions are all connected to the main body portion.

In some embodiments, the display apparatus further includes second dummy electrodes. A second dummy electrode is disposed between two adjacent first touch electrodes that belong to different first touch channels and between two adjacent second touch electrodes that belong to different second touch channels; the second dummy electrode is insulated from the two adjacent first touch electrodes and the two adjacent second touch electrodes.

In some embodiments, the second dummy electrode is in a shape of a rectangle.

In some embodiments, the at least one first touch channel includes a plurality of first sub-channels, and the plurality of first sub-channels are arranged in the second direction; each first sub-channel extends in the first direction, and the first sub-channel includes multiple first touch electrodes that are electrically connected; first sub-channels included in a same first touch channel are electrical connected, and/or the at least one second touch channel includes a plurality of second sub-channels, and the plurality of second sub-channels are arranged in the first direction; each second sub-channel extends in the second direction, and the second sub-channel includes multiple second touch electrodes that are electrically connected; second sub-channels included in a same second touch channel are electrically connected.

In some embodiments, in a same first touch channel, first touch electrodes adjacent in the second direction in at least one pair are electrically connected; and/or in a same second touch channel, second touch electrodes adjacent in the first direction in at least one pair are electrically connected.

In some embodiments, the at least one first touch channel further includes first connection portions; in a same first touch channel, two first touch electrodes adjacent in the second direction in at least one pair are electrically connected through a first connection portion; and/or the at least one second touch channel further includes second connection portions; in a same second touch channel, two second touch electrodes adjacent in the first direction in at least one pair are electrically connected through a second connection portion.

In some embodiments, the display apparatus includes a first conductive layer, an insulating layer and a second conductive layer that are stacked. The insulating layer is located between the first conductive layer and the second conductive layer, the insulating layer is provided with a plurality of via holes therein, and the first touch electrodes and the second touch electrodes are located in the first conductive layer.

The display apparatus comprising: at least one pair of first connection portion and second connection portion that cross to each other. The first connection portion is located in the first conductive layer, the second connection portion is located in the second conductive layer, and the second connection portion is electrically connected to a corresponding second touch electrode through a via hole; alternatively, the second connection portion is located in the first conductive layer, the first connection portion is located in the second conductive layer, and the first connection portion is electrically connected to a corresponding first touch electrode through a via hole.

In some embodiments, a first touch channel of the plurality of first touch channels is located in a first rectangular region extending in the first direction, and a second touch channel of the plurality of second touch channels is located in a second rectangular region in the second direction; and a rectangular region where the first rectangular region and the second rectangular region intersect is a touch unit region.

The touch unit region is provided with a plurality of first electrode groups and a plurality of second electrode groups therein, each first electrode group includes multiple first touch electrodes electrically connected in sequence in the first direction, and each second electrode group includes multiple second touch electrodes electrically connected in sequence in the second direction; the plurality of first electrode groups belong to a plurality of first sub-channels of a same first touch channel, and the plurality of second electrode groups belong to a plurality of second sub-channels of a same second touch channel.

Multiple first touch electrodes located on a same edge of the touch unit region in the plurality of first electrode groups are multiple first setting electrodes, and the multiple first setting electrodes are connected in series in the second direction. Multiple second touch electrodes located on a same edge of the touch unit region in the plurality of second electrode groups are multiple second setting electrodes, and the multiple second setting electrodes are connected in series in the first direction.

In some embodiments, in a case where the display apparatus further includes a first connection portion and a second connection portion, the plurality of first setting electrodes are connected in series through the first connection portion, and the plurality of second setting electrodes are connected in series through the second connecting portion; the first connecting portion and the second connecting portion are arranged in a same conductive layer.

In another hand, a touch structure is provided. The touch structure includes a plurality of first touch channels, a plurality of second touch channels and first dummy electrodes.

Among the plurality of first touch channels, each first touch channel extends in a first direction, each first touch channel includes a plurality of first touch electrodes arranged in sequence in the first direction, and two adjacent first touch electrodes are electrically connected.

Among the plurality of second touch channels, each second touch channel extends in a second direction, each second touch channel includes a plurality of second touch electrodes arranged in sequence in the second direction, and two adjacent second touch electrodes are electrically connected; the first touch channels and the second touch channels intersect with each other and are insulated from each other; the first direction and the second direction intersect with each other.

A first dummy electrode is disposed between adjacent first touch electrode and second touch electrode, and is insulated from the first touch electrode and the second touch electrode. A border of the first dummy electrode proximate to the first touch electrode and a border of the first dummy electrode proximate to the second touch electrode are each in a shape of a zigzag, borders of the first dummy electrode and the first touch electrode proximate to each other match to each other in shape, and borders of the first dummy electrode and the second touch electrode proximate to each other match to each other in shape.

In some embodiments, the first dummy electrode includes a plurality of extension portions connected in sequence, each extension portion is in a shape of a strip, and extension directions of any two adjacent extension portions intersect.

In some embodiments, four first dummy electrodes of all the first dummy electrodes are arranged around the first touch electrode, and the four first dummy electrodes are centrally symmetrically arranged with respect to a center of the first touch electrode; and four first dummy electrodes of all the first dummy electrodes are arranged around the second touch electrode, and the four first dummy electrodes are centrally symmetrically arranged with respect to a center of the second touch electrode.

In some embodiments, at least one first touch channel includes a plurality of first sub-channels, and the plurality of first sub-channels are arranged in the second direction; each first sub-channel extends in the first direction, and the first sub-channel includes multiple first touch electrodes that are electrically connected; first sub-channels included in a same first touch channel are electrical connected; and/or at least one second touch channel includes a plurality of second sub-channels, and the plurality of second sub-channels are arranged in the first direction; each second sub-channel extends in the second direction, and the second sub-channel includes multiple second touch electrodes that are electrically connected; second sub-channels included in a same second touch channel are electrically connected.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
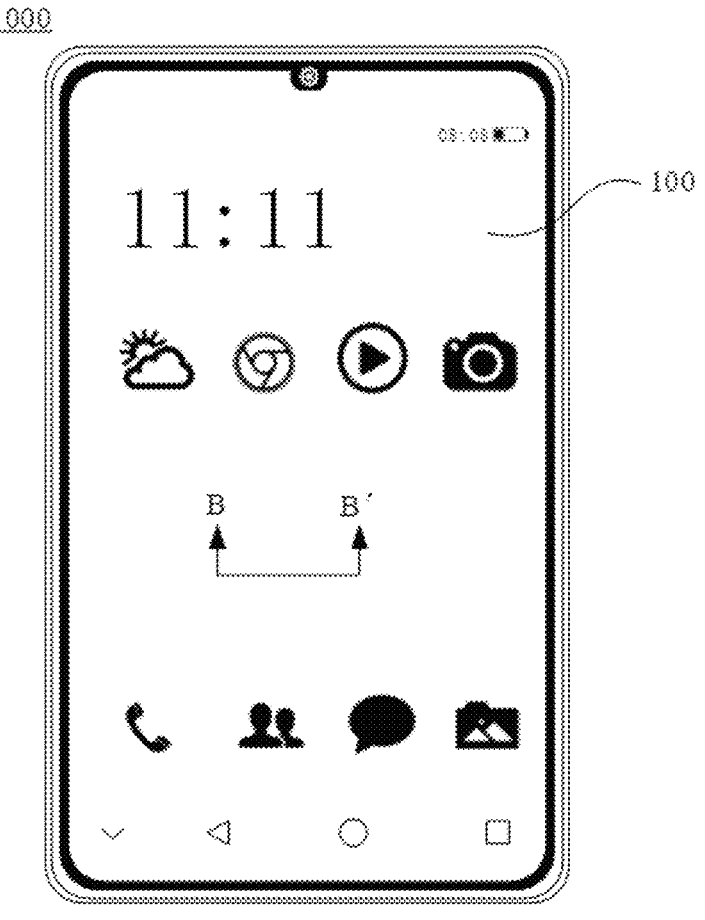
FIG. 1 is a top view of a display apparatus, in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, the term such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "electrically connected" and "connected" and derivatives thereof may be used. For example, the term "electrically connected" may be used in the description of some embodiments to indicate that two or more components are in direct physical contact or electrical contact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

In the description of the present disclosure, it will be understood that, orientations or positional relationships indicated by the terms such as "center", "longitudinal", "transverse", "length", "width", "vertical", "horizontal", "inner", "outer" are based on orientations or positional relationships shown in the drawings, which is merely for convenience in description of the present disclosure and simplifying the description, but not to indicate or imply that the indicated apparatus or element must have a specific orientation, or be constructed and operated in a specific orientation.

It will be understood that, in a case that a layer or element is referred to be on another layer or substrate, it may be that the layer or element is directly on the another layer or substrate, or it may be that there is an intermediate layer between the layer or element and the another layer or substrate.

Exemplary embodiments are described herein with reference to sectional views and/or plan views as idealized exemplary drawings. In the drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in an apparatus, and are not intended to limit the scope of the exemplary embodiments.

FIG. 1 is a top view of a display apparatus 1000, in accordance with some embodiments. The display apparatus 1000 may be any device that can display images whether in motion (e.g., a video) or stationary (e.g., a still image), and regardless of text or image. More specifically, it is anticipated that the described embodiments may be implemented in or associated with a variety of electronic devices, such as (but not limited to), a mobile phone, a wireless device, a personal digital assistant (PDA), a virtual reality (VR) display, a hand-held or portable computer, a global positioning system (GPS) receiver/navigator, a camera, an moving picture experts group 4 (MP4) video player, a video camera, a game console, a watch, a clock, a calculator, a television monitor, a flat panel display, a computer monitor, an automobile display (e.g., an odometer display), a navigator, a cockpit controller and/or display, a display of camera views (e.g., a display of a rear-view camera in a vehicle), an electronic photo, an electronic billboard or sign, a projector, a building structure, a packaging and aesthetic structure (e.g., a display for displaying an image of a piece of jewelry).

Figure 2:
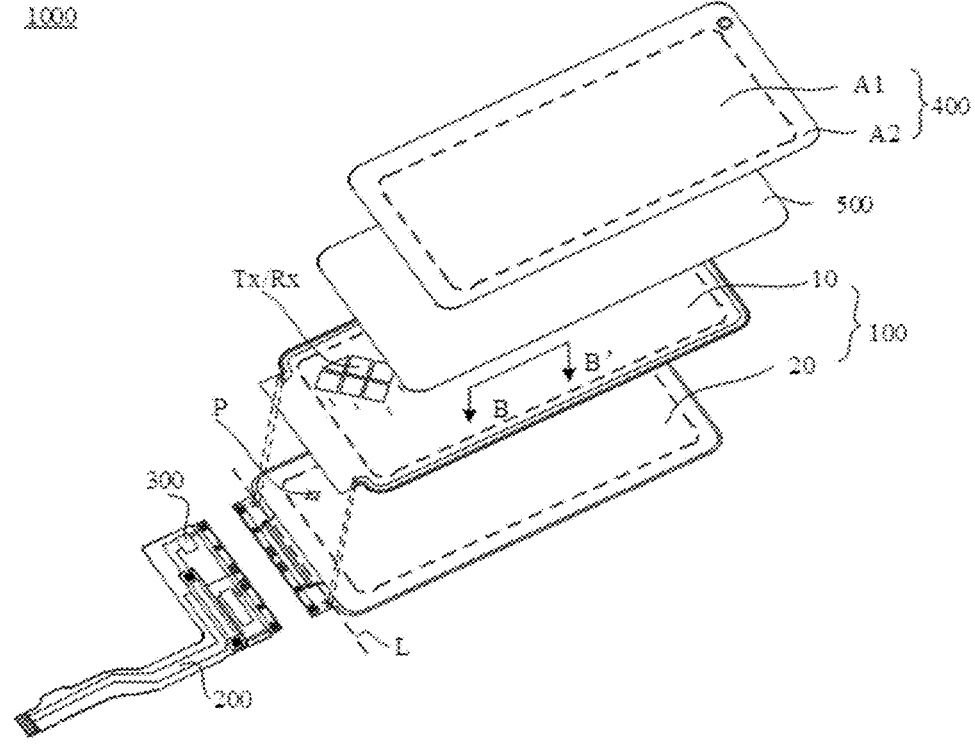
FIG. 2 is a exploded view of a display apparatus, in accordance with some embodiments.

In some embodiments, as shown in FIG. 2, the display apparatus 1000 includes a display panel 100.

The display panel 100 may be a liquid crystal display panel (LCD); the display panel 100 may also be an electroluminescent display panel or a photoluminescent display panel. In a case where the display panel 100 is an electroluminescent display panel, the electroluminescent display panel may be an organic light-emitting diode (OLED) display panel or a quantum dot light-emitting diode (QLED) display panel. In a case where the display panel 100 is a photoluminescent display panel, the photoluminescent display panel may be a quantum dot photoluminescent display panel.

The display panel 100 includes a display side and a non-display side, the display side is a side of the display panel 100 for display, and the non-display side is a side of the display panel 100 facing away from the display side.

For example, as shown in FIG. 2, the display panel 100 may include a light-emitting substrate 20 and a touch structure 10.

In some embodiments, as shown in FIG. 2, the display apparatus 1000 further includes a flexible circuit board 200.

The flexible circuit board 200 is configured to be bonded to the display panel 100. Referring to FIG. 2, the flexible circuit board 200 may be bent along the dotted line L toward the non-display side of the display panel 100, so that the flexible circuit board 200 is located on the back of the display panel 100.

In some embodiments, as shown in FIG. 2, the display apparatus 1000 further includes a touch chip 300.

For example, referring to FIG. 2, the touch chip 300 is disposed on the flexible circuit board 200. The touch chip 300 is configured to be electrically connected to the touch structure in the display panel 100, so as to transmit touch signals to the touch structure to implement the touch function.

In some embodiments, as shown in FIG. 2, the display apparatus 1000 further includes a cover plate 400 and a polarizer 500 disposed between the cover plate 400 and the display panel 100.

The polarizer 500 is configured to reduce reflection of the external light by the metal structure in the display panel 100. The polarizer 500 and the cover plate 400 are attached together through optical adhesive.

As shown in FIG. 2, the cover 400 may include a light-transmitting region A1 and a light-shielding region A2. The light-transmitting region A1 may at least partially overlap with the display area (effective light-emitting display area) of the display panel 100, and the light emitted from the display panel 100 may pass through the light-transmitting region A1 of the cover plate 400 and be emitted to the outside to be visible to the human eyes. The light-shielding region A2 may be disposed at the periphery of the light-transmitting region A1 and may at least partially overlap with a peripheral area (disposed around the display area) of the display panel 100, which facilitates the wiring in the peripheral area of the display panel 100.

In some embodiments, the display apparatus 1000 further includes a rear shell. For example, the rear shell may be a U-shaped groove, and the rear shell and the cover plate 400 are assembled together to form a frame of the display apparatus 1000, and the aforementioned display panel 100, the bent flexible circuit board 200 and other components are disposed within the frame.

Figure 3:
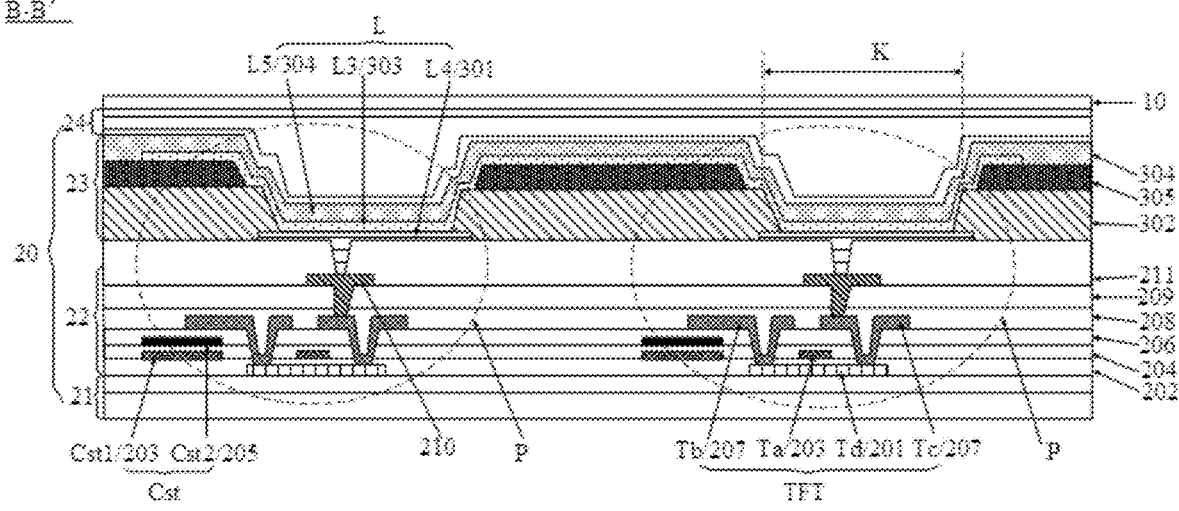
FIG. 3 is a sectional view taken along the section line B-B' shown in FIG. 1.

In some embodiments provided by the present disclosure, as shown in FIGS. 2 and 3, the display panel 100 includes the touch structure 10 and a light-emitting substrate 20.

Referring to FIG. 2, the light-emitting substrate 20 includes a plurality of sub-pixels P, and the light-emitting substrate 20 is configured to emit light to implement display.

Referring to FIG. 3, the light-emitting substrate 20 includes a substrate 21 and a pixel circuit layer 22 and a light-emitting device layer 23 that are disposed on the substrate 21.

The substrate 21 may be of a single-layer structure or a multi-layer structure. For example, the substrate 21 may include a flexible base layer and a buffer layer that are stacked. For another example, the substrate 21 may include a plurality of flexible base layers and buffer layers that are alternately arranged. A material of the flexible base layer may include polyimide, and a material of the buffer layer may include silicon nitride and/or silicon oxide, so as to achieve an effect of blocking moisture, oxygen and alkaline ions.

The pixel circuit layer 22 includes an active layer 201, a first gate insulating layer 202, a first gate conductive layer 203, a second gate insulating layer 204, a second gate conductive layer 205, an interlayer dielectric layer 206, a first source-drain conductive layer 207, a passivation layer 208, a first planarization layer 209, a second source-drain conductive layer 210 and a second planarization layer 211 that are sequentially stacked on the substrate 21.

Optionally, the source-drain conductive layer may have only one layer (e.g., only the first source-drain conductive layer 207 or only the second source-drain conductive layer 210), and accordingly, the planarization layer may have only one layer (e.g., only the first planarization layer 209 or only the second planarization layer 211).

The pixel circuit layer 22 is provided therein with a plurality of thin film transistors TFT and a plurality of capacitor structures Cst. Each sub-pixel P includes at least one thin film transistor TFT and at least one capacitor structure Cst. Only two thin film transistors TFT and two corresponding capacitor structures Cst are illustrated in FIG. 3.

The thin film transistor TFT includes a gate Ta, a source Tb, a drain Tc, and an active layer pattern Td. The source Tb and the drain Tc are in contact with the active layer pattern Td.

The active layer pattern Td is configured to form a channel under control of the gate Ta, so that the source Tb and the drain Tc that are connected to the active layer pattern Td are conductive, and thus the thin film transistor TFT is turned on. For example, the thin film transistor TFT further includes a portion of the first gate insulating layer 202 located between the film layer where the gate Ta is located and the film layer where the active layer pattern Td is located.

It will be noted that a control electrode of each thin film transistor TFT is a gate Ta of the thin film transistor, a first electrode of the thin film transistor is one of a source Tb and a drain Tc of the thin film transistor TFT, and a second electrode of the thin film transistor is the other of the source Tb and the drain Tc of the thin film transistor TFT. Since the source Tb and the drain Tc of the thin film transistor TFT may be symmetrical in structure, there may be no difference in structure between the source Tb and the drain Tc of the thin film transistor TFT.

The capacitor structure Cst includes a first plate Cst1 and a second plate Cst2; the first plate Cst1 is located in the first gate conductive layer 203, and the second plate Cst2 is located in the second gate conductive layer 205.

The light-emitting device layer 23 includes an anode layer 301, a pixel definition layer 302, a light-emitting functional layer 303 and a cathode layer 304 that are sequentially arranged on a side of the pixel circuit layer 22 away from the substrate 21.

The light-emitting device layer 23 is provided therein with a plurality of light-emitting devices L. Each sub-pixel P includes a light-emitting device L. The light-emitting device L includes an anode L4 located in the anode layer 301, a cathode L5 located in the cathode layer 304, and a light-emitting pattern L3 located in the light-emitting functional layer 303.

The anode L4 located in the anode layer 301 is configured to transmit a high-level voltage (e.g., a power supply voltage signal VDD), and the cathode L5 located in the cathode layer 304 is configured to transmit a low-level voltage (e.g., a cathode voltage signal VSS). Due to the action of the electric field generated between the anode L4 and the cathode L5, the light-emitting pattern L3 may emit light.

For example, other than the light-emitting pattern L3, the light-emitting functional layer 303 further includes one or more of an electron transporting layer (ETL), an electron injection layer (EIL), a hole transporting layer (HTL) and a hole injection layer (HIL).

For example, the anode L4 may be electrically connected to the source Tb or the drain Tc of the thin film transistor TFT, so that the light emitting device L emits light under the control of the thin film transistor TFT.

For example, as shown in FIG. 3, the pixel definition layer 302 is provided therein with a plurality of openings K. The light-emitting pattern L3 is at least partially located within the opening K. The light emitted by the light-emitting pattern L3 is emitted to the outside through the opening K.

For example, as shown in FIG. 3, a support layer 305 may be provided between the pixel definition layer 302 and the cathode layer 304. The support layer 305 may play a role in supporting the protective film layer to avoid the break of the anode layer 301 or other traces due to the contact between the protective film layer and the anode layer 301 or other traces.

For example, as shown in FIG. 3, the light-emitting substrate 20 may further include an encapsulation layer 24 disposed on a side of the light-emitting devices L away from the substrate 21. The encapsulation layer 24 includes a first encapsulation sub-layer, a second encapsulation sub-layer, and a third encapsulation sub-layer that are stacked in sequence in a direction of moving away from the substrate 21. For example, the materials of the first encapsulation sub-layer and the third encapsulation sub-layer include inorganic materials, and the material of the second encapsulation sub-layer includes organic materials. The first encapsulation sub-layer and the third encapsulation sub-layer have a function of blocking moisture and oxygen, and the second encapsulation sub-layer has certain flexibility and a function of absorbing moisture.

The light-emitting substrate 20 has a light exit side and a backlight side. The light exit side refers to a side of the light-emitting substrate 20 that emits light, and the backlight side refers to a side of the light-emitting substrate 20 away from the light exit side.

Referring to FIG. 3, the touch structure 10 is disposed on the light exit side of the light-emitting substrate 20.

The touch structure 10 may be configured to sense the touch of a user and obtain touch information, for example, sense the touch of the finger of the user or stylus, and obtain touch coordinate information to implement the touch function of the display panel 100.

In some embodiments, the touch structure 10 may be formed as a separate component, and the touch structure 10 is adhered to the encapsulation layer 24 of the light-emitting substrate 20 by an adhesive layer. In the case where the touch structure 10 forms a separate element (e.g., a separate film layer), the touch structure 10 may further include a carrier film for carrying touch electrodes.

For example, the carrier film may be at least one of a resin film, a glass base, and a composite film.

For example, the adhesive layer may be at least one of a pressure-sensitive adhesive (PSA), an optical clear adhesive (OCA), and an optical clear resin (OCR).

In some other embodiments, referring to FIG. 3, the touch structure 10 may be directly disposed on the light-emitting substrate 20, for example, directly on the encapsulation layer 24 of the light-emitting substrate 20; that is, there is no film layer provided between the touch structure 10 and the encapsulation layer 24. For example, the touch structure 10 may be formed on the encapsulation layer 24 of the light-emitting substrate 20 through a continuous process; that is, the touch structure 10 may be formed directly on the encapsulation layer 24 after the encapsulation layer 24 is formed on the light-emitting substrate 20, which facilitates the manufacturing of the lightness and thinness display apparatus 1000, and has good application prospects.

In addition to being touched by fingers, the touch structure 10 may be touched by a stylus.

The stylus may include an active capacitive pen (i.e., active pen) and a passive capacitive pen (i.e., a passive pen).

The passive pen, like a finger, changes the capacitance of the touch structure 10 at the contact position by being contact with the touch structure 10, thereby achieving the same touch effect as the finger.

The active pen is equipped with its own circuit, and the touch structure 10 receives a signal emitted by the active pen, thereby obtaining the coordinates of the active pen on the display screen to achieve the touch effect. The active pen does not need to be in direct contact with the touch structure 10, that is, the active pen may achieve floating touch.

Compared with the passive pen, the active pen has both the floating touch function (which may prevent the display from being damaged by the stylus) and the switch control function (which may enable the active pen's own circuit to be turned off when not in use to prevent accidental touches), and is suitable for a wide application scenarios.

With the development of touch display technologies, there are higher requirements for the performance of active pens. The performance of active pens can include accuracy, linearity, signal-to-noise ratio, and suspension height.

The higher the accuracy, the more accurate the touch position of the active pen. The higher the linearity, the more exquisite the lines drawn by the active pen on the touch structure 10, and the lower the possibility of jitter in the lines. The higher the signal-to-noise ratio, i.e., the higher the ratio between the signal transmitted by the active pen's own circuit and the environmental noise signal, which means that the greater the proportion of effective signals emitted by the active pen to achieve touch, i.e., the lower the interference of environmental noise signals on touch, and the better the touch effect. The higher the suspension height and the more uniform the suspension height at different touch positions, the better the active pen usage experience.

In some embodiments, referring to FIG. 3, after the touch structure 10 is laid on the light exit side of the light-emitting substrate 20, there is a facing area between the touch structure 10 and the conductive structure in the light-emitting substrate 20, which resulting in a case that the parasitic capacitance is easily to be generated.

For example, referring to FIG. 3, the cathode layer 304 is designed to be of a whole layer. There is a facing area between the touch structure 10 and the cathode layer 304. When current flows through the touch structure 10, the parasitic capacitance (i.e., a noise signal) will be generated between the touch structure 10 and the cathode layer 304. The greater the value of the parasitic capacitance, the greater the interference to the touch signal emitted by the active pen, i.e., the less the signal-to-noise ratio of the active pen; the touch chip cannot distinguish the signal emitted by the active pen from the noise signal through filtering, resulting in poor performance of the active pen.

In order to solve the above problems, embodiments of the present disclosure provide a display apparatus 1000.

Figure 4:
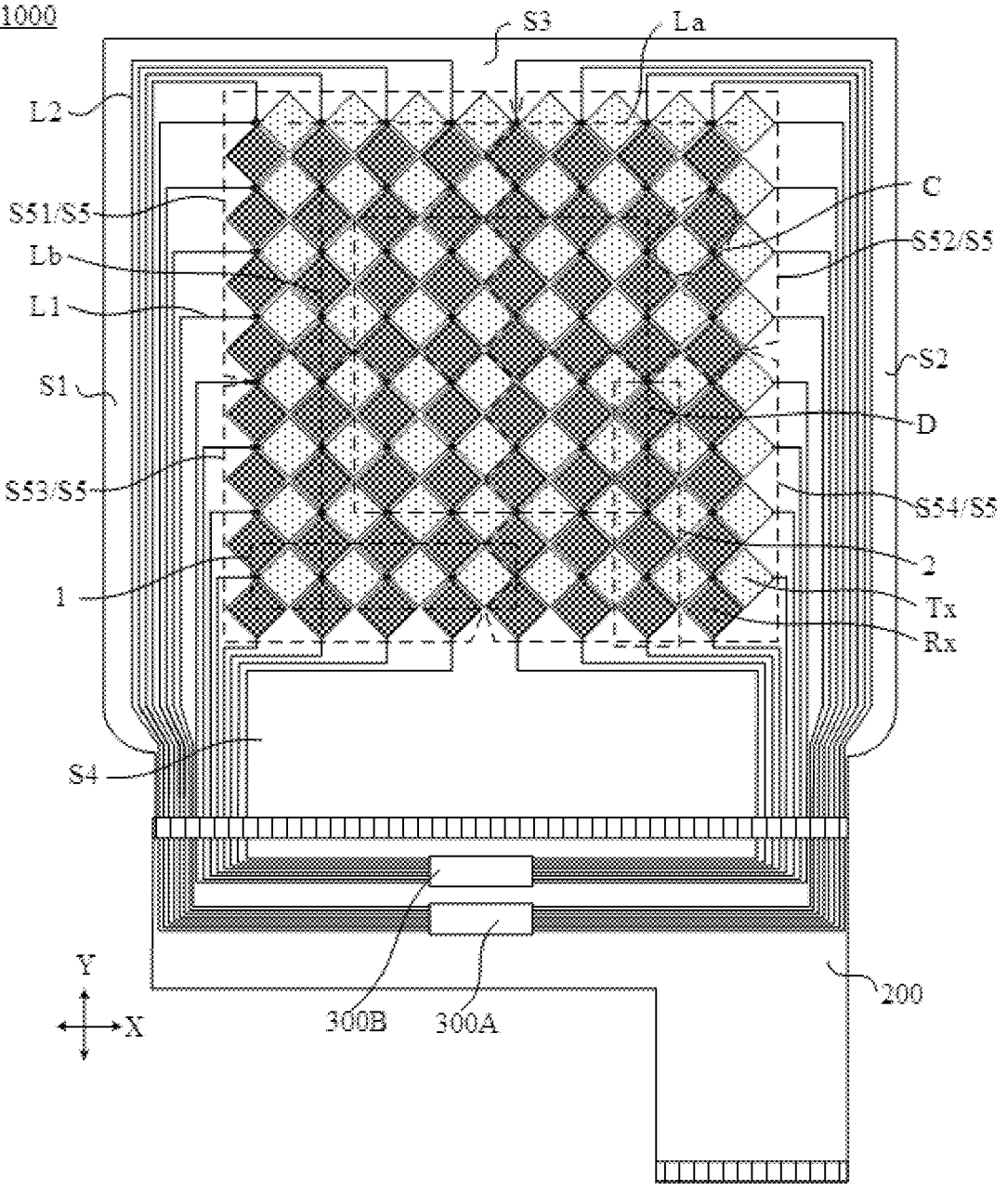
FIG. 4 is a top view of another display apparatus, in accordance with some embodiments.

As shown in FIG. 4, the touch structure 10 of the display apparatus 1000 includes a touch region S5, a fan-out region S4, a first peripheral region S1, a second peripheral region S2, and a third peripheral region S3 that surrounding the touch region S5.

Referring to FIG. 4, the first peripheral region S1 and the second peripheral region S2 are respectively located on two sides of the touch region S5 in a first direction X, and the fan-out region S4 and the third peripheral region S3 are respectively located on two sides of the touch region S5 in a second direction Y.

The first direction X and the second direction Y intersect with each other. For example, the first direction X and the second direction Y are perpendicular to each other.

It will be noted that the first direction X may be the horizontal direction of the display apparatus 1000, and the second direction Y may be the vertical direction of the display apparatus 1000; alternatively, the first direction X may be a row direction in the array arrangement of the plurality of sub-pixels P, and the second direction Y may be the column direction in the array arrangement of the plurality of sub-pixels P.

The various drawings of the present disclosure are illustrated by taking an example in which the first direction X is the row direction and the second direction Y is the column direction. In the embodiments of the present disclosure, technical solutions obtained by rotating the drawings at a certain angle (e.g., 30 degrees, 45 degrees, or 90 degrees) shall also be included in the protection scope of the present disclosure.

The fan-out region S4, the first peripheral region S1, the second peripheral region S2 and the third peripheral region S3 that surround the touch region S5 are configured for wiring multiple touch traces (including first touch traces L1 and second touch traces L2 shown in FIG. 4). The fan-out region S4 is further configured to be bonded to the flexible circuit board 200. The multiple touch traces in the display apparatus 1000 eventually extend to the fan-out region S4 and are exposed in the fan-out region S4. The exposed parts serve as pins to facilitate the bonding with the flexible circuit board 200, so that multiple touch traces are electrically connected to the touch chip 300 on the flexible circuit board 200, so as to realize the touch function of the display apparatus 1000.

Referring to FIG. 4, the touch region S5 is configured to provide therein with a plurality of touch electrodes (including first touch electrode Tx and second touch electrode Rx as shown in FIG. 4); that is, the touch region S5 is an effective touch region of the touch structure 10 of the display apparatus 1000.

The touch region S5 includes a first sub-region S51, a second sub-region S52, a third sub-region S53 and a fourth sub-region S54.

The first sub-region S51 and the second sub-region S52 are arranged in the first direction X, the first sub-region S51 and the third sub-region S53 are arranged in the second direction Y, the third sub-region S53 and the fourth sub-region S54 are arranged in the first direction X. That is, the four sub-regions (the first sub-region S51, the second sub-region S52, the third sub-region S53 and the fourth sub-region S54) are distributed in an array in the first direction X and the second direction Y.

Referring to FIG. 4, the display apparatus 1000 includes a plurality of first touch channels 1 and a plurality of second touch channels 2.

It will be noted that the term "first touch channel 1" is a channel composed of multiple first touch electrodes Tx that are electrically connected to each other and transmit the same first touch signal at the same time in the touch structure 10; the term "second touch channel 2" is a channel composed of multiple second touch electrodes Rx that are electrically connected to each other and transmit the same second touch signal at the same time in the touch structure 10.

Each first touch channel 1 includes a plurality of first touch electrodes Tx arranged in the first direction X and connected in series. Each second touch channel 2 includes a plurality of second touch electrodes Rx arranged in the second direction Y and connected in series.

For example, the plurality of first touch channels 1 and the plurality of second touch channels 2 are insulated from each other, and the plurality of first touch channels 1 and the plurality of second touch channels 2 intersect with each other, so that the first touch electrodes Tx and the second touch electrodes Rx are insulated from each other and arranged alternately.

For example, as shown in FIG. 4, the first touch electrodes Tx and the second touch electrodes Rx are alternately arranged, and the adjacent different touch electrodes (i.e., the first touch electrodes Tx and the second touch electrodes Rx) are insulated from each other and may generate mutual capacitance. The mutual capacitance value of these touch electrodes will change after being touched. By detecting the mutual capacitance value, the change amount of the mutual capacitance value before and after the touch may be determined to determine the touch position, so that the touch effect of the touch structure 10 is achieved.

Figure 5:
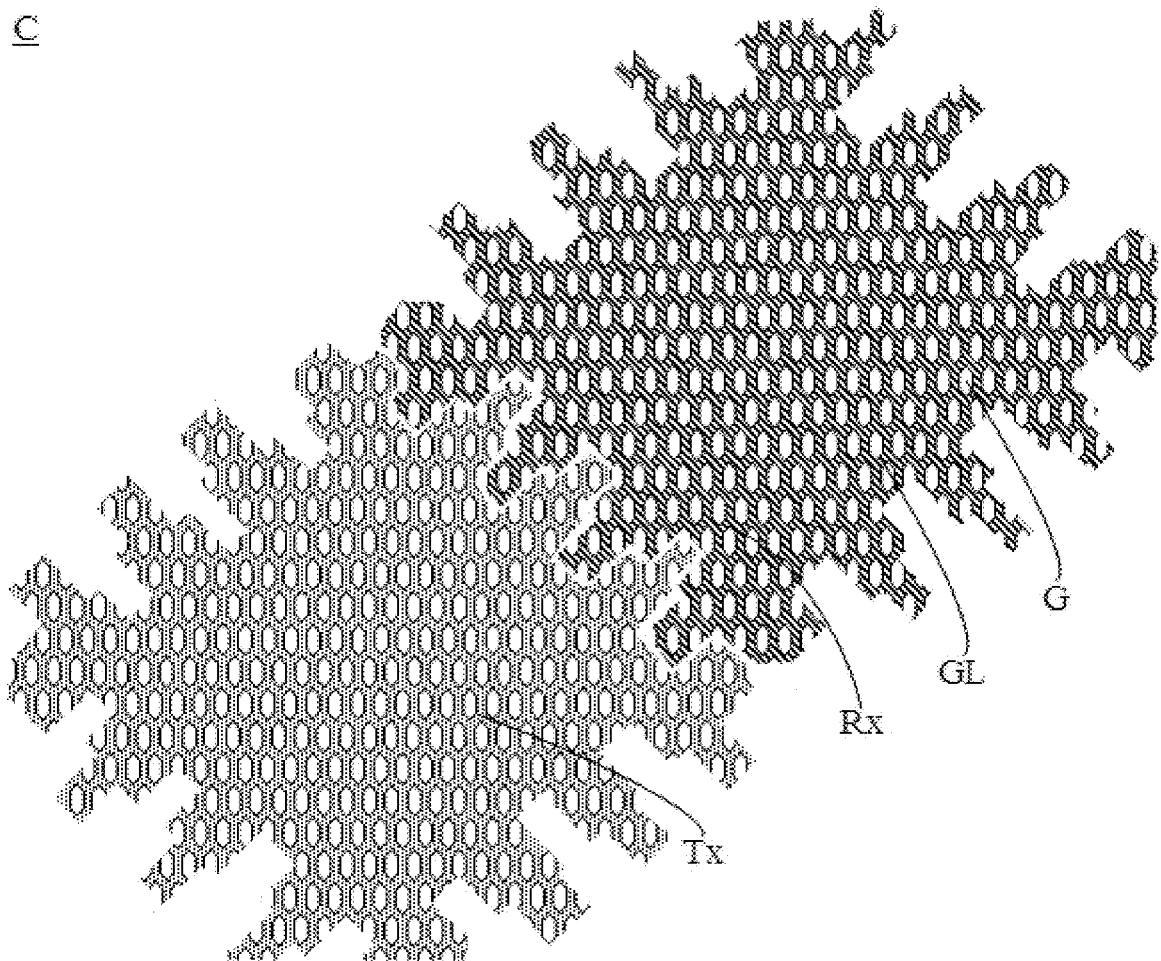
FIG. 5 is an enlarged view of a structure corresponding to the region where the dotted box C in FIG. 4 is located.

For example, as shown in FIG. 5, the touch structure 10 of the display apparatus 1000 includes a plurality of metal lines GL, and the plurality of metal lines GL intersect with each other to form a plurality of metal meshes G.

For example, as shown in FIG. 5, in the touch structure 10, the touch electrodes (including the first touch electrode Tx and the second touch electrode Rx) employ a metal mesh structure (i.e., including a plurality of metal meshes G). Compared with using indium tin oxide (ITO) to form planar electrodes as touch electrodes, the touch electrodes with a metal mesh structure have small resistance and high sensitivity, which may improve the touch sensitivity of the touch structure 10. In addition, the touch electrodes with a metal mesh structure have high mechanical strength, which may reduce the weight of the touch structure 10, and thus, in a case where the touch structure 10 is used in the display apparatus 1000, it is possible to achieve the lightness and thinness of the display apparatus 1000.

For example, as shown in FIG. 5, the first touch electrodes Tx and the second touch electrodes Rx each have a metal mesh structure. The metal mesh G of the first touch electrode Tx and the metal mesh G of the second touch electrode Rx may be disposed in the same film layer, and the metal mesh G of the first touch electrode Tx is disconnected to the metal mesh G of the second touch electrode Rx, so that the first touch electrode Tx is insulated from the second touch electrode Rx.

It will be noted that the metal mesh G in FIG. 5 is filled with different patterns in order to distinguish different touch electrodes. The metal mesh G of the first touch electrode Tx and the metal mesh G of the second touch electrode Rx may be made of the same material, and formed by using the same process.

For example, as shown in FIG. 5, the first touch electrode Tx and the second touch electrode Rx are both in a shape of a rhombus or substantially rhombus. The term "substantially rhombus" means that the touch electrode (i.e., the first touch electrode Tx and the second touch electrode Rx) is in a shape of a rhombus as a whole, but is not limited to a standard rhombus. For example, the border of the touch electrode is allowed to be non-linear (e.g., in a shape of a zigzag). For example, in the following embodiments, the touch electrode involved is in a shape of a rhombus as a whole, but its boundary is in a shape of a zigzag.

Furthermore, in the embodiments of the present disclosure, the shape of the electrode pattern of the first touch electrode Tx and the second touch electrode Rx is not limited to a rhombus or substantially to a rhombus, and may also be rectangular, elongated, or the like.

For example, depending on the different manner in which the metal lines GL intersect, a metal mesh G may be substantially in a shape of a hexagon, a rectangle, or an irregular polygon.

Referring to FIG. 4, each sub-region (the first sub-region S51, the second sub-region S52, the third sub-region S53 or the fourth sub-region S54) is provided therein with at least one first touch channel 1 and at least one second touch channel 2, and the at least one first touch channel 1 and at least one second touch channel 2 located in the same sub-region are arranged crosswise and insulated from each other.

That is, each sub-region is provided with multiple first touch electrodes Tx and multiple second touch electrodes Rx. Corresponding to the four sub-regions, the touch structure 10 of the display apparatus 1000 is divided into four touch screens (i.e., the parts where the four sub-regions of the touch structure 10 are located).

For example, referring to FIG. 4, each sub-region is provided therein with multiple first touch channels 1 and multiple second touch channels 2; the multiple first touch channels 1 are arranged in the second direction Y, and each first touch channel 1 extends in the first direction X; the multiple second touch channels 2 are arranged in the first direction X, and each second touch channel 2 extends in the second direction Y.

Figure 6:
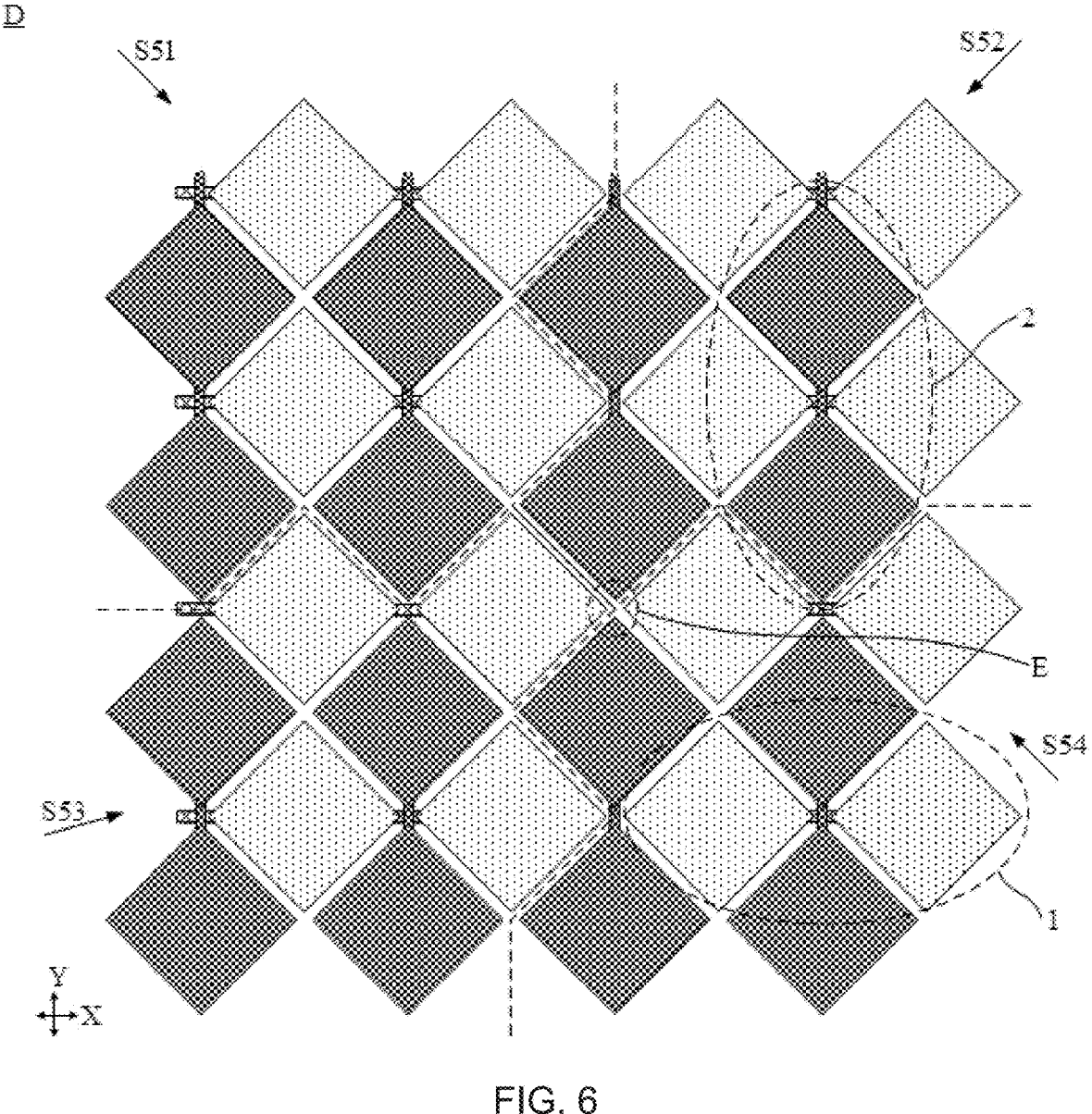
FIG. 6 is an enlarged view of a structure corresponding to the region where the dotted box D in FIG. 4 is located.

Referring to FIGS. 4 and 6, the first touch channels 1 located in different sub-regions are insulated from each other, and the second touch channels 2 located in different sub-regions are insulated from each other.

For example, referring to FIG. 6, two first touch channels 1 located in different sub-regions and adjacent to each other are disconnected to each other, and two second touch channels 2 located in different sub-regions and located adjacent to each other are disconnected to each other. That is, different parts of the touch structure 10 corresponding to different sub-regions are insulated from each other, thereby dividing the touch structure 10 into four touch screens.

Referring to FIG. 4, the display apparatus 1000 further includes a plurality of first touch traces L1 and a plurality of second touch traces L2.

The plurality of first touch traces L1 are electrically connected to the plurality of first touch channels 1. For example, the plurality of first touch traces L1 are electrically connected to the plurality of first touch channels 1 in a one-to-one correspondence; that is, a first touch trace L1 is electrically connected to a first touch channel 1. The first touch trace L1 is configured to be electrically connected to the first touch channel 1, so as to transmit a touch signal to the first touch electrode Tx in the first touch channel 1.

The plurality of second touch traces L2 are electrically connected to the plurality of second touch channels 2. For example, the plurality of second touch traces L2 are electrically connected to the plurality of second touch channels 2 in a one-to-one correspondence; that is, a second touch trace L2 is electrically connected to a second touch channel 2. The second touch trace L2 is configured to be electrically connected to the second touch channel 2, so as to transmit a touch signal to the second touch electrode Rx in the second touch channel 2.

Referring to FIG. 4, the first touch traces L1 connected to the first touch channels 1 in the first sub-region S51 and the third sub-region S53 extend from the first peripheral region S1 to the fan-out region S4.

For example, referring to FIG. 4, the first sub-region S51 is closer to the third peripheral region S3 than the third sub-region S53. The first touch traces L1 electrically connected to the first touch channels 1 in the first sub-region S51 are led out from the part of the first peripheral region S1 proximate to the third peripheral region S3 and extend to the fan-out region S4 along the first peripheral region S1, and are finally bonded to the flexible circuit board 200 passing through the fan-out region S4. The first touch traces L1 electrically connected to the first touch channels 1 in the third sub-region S53 are led out from the part of the first peripheral region S1 away from the third peripheral region S3 and extend to the fan-out region S4 along the first peripheral region S1, and are finally bonded to the flexible circuit board 200 passing through the fan-out region S4.

For example, referring to FIG. 4, a part of the first touch traces L1, connected to the first touch channels 1 in the first sub-region S51, in the first peripheral region S1 is further far away from the touch region S5 than a part of the first touch traces L1, connected to the first touch channels 1 in the third sub-region S5, in the first peripheral region S1, which may prevent the first touch traces L1 connected to the first touch channels 1 in the first sub-region S51 from intersecting, in the first peripheral region S1, the first touch traces L1 connected to the first touch channels 1 in the third sub-region S53, thereby optimizing the wiring space.

Referring to FIG. 4, the first touch traces L1 connected to the first touch channels 1 in the second sub-region S52 and the fourth sub-region S54 extend from the second peripheral region S2 to the fan-out region S4.

For example, referring to FIG. 4, the second sub-region S52 is closer to the third peripheral region S3 than the fourth sub-region S54. The first touch traces L1 electrically connected to the first touch channels 1 in the second sub-region S52 are led out from a part of the second peripheral region S2 proximate to the third peripheral region S3 and extend to the fan-out region S4 along the second peripheral region S2, and are finally bonded to the flexible circuit board 200 passing through the fan-out region S4. The first touch traces L1 electrically connected to the first touch channels 1 in the fourth sub-region S54 are led out from a part of the second peripheral region S2 away from the third peripheral region S3 and extend to the fan-out area S4 along the second peripheral region S2, and are finally bonded to the flexible circuit board 200 through the fan-out region S4.

For example, referring to FIG. 4, a part of the first touch traces L1, connected to the touch channels 1 in the second sub-region S52, in the second peripheral region S2 is located further away from the touch region S5 than a part of the first touch traces L1, connected to the first touch channels 1 in the fourth sub-region S54, in the second peripheral region S2, which may prevent the first touch traces L1, connected to the first touch channels 1 in the second sub-region S52, from intersecting, the first touch traces L1, connected to the first touch channels 1 in the fourth sub-region S54, in the second peripheral region S2, thereby optimizing the wiring space.

Referring to FIG. 4, the second touch traces L2 connected to the second touch channels 2 in the first sub-region S51 are led out from the third peripheral region S3, extend to the fan-out region S4 passing through the first peripheral region S1, and finally bonded to the flexible circuit board 200 passing through the fan-out region S4.

The second touch traces L2 connected to the second touch channels 2 in the second sub-region S52 are led out from the third peripheral region S3, extend to the fan-out region S4 passing through the second peripheral region S2, and are finally bonded to the flexible circuit board 200 passing through the fan-out region S4.

The second touch traces L2 electrically connected to the second touch channels 2 in the third sub-region S53 and the fourth sub-region S54 directly extend to the fan-out region S4, and are finally bonded to the flexible circuit board 200 passing through the fan-out region S4.

For example, referring to FIG. 4, a part of the second touch traces L2, connected to the second touch channels 2 in the first sub-region S51, in the first peripheral region S1 is further far away from the touch region S5 than a part of the first touch traces L1, connected to the first touch channels 1 in the first sub-region S51, in the first peripheral region S1, which may prevent the first touch traces L1 from intersecting the second touch traces L2 in the first peripheral region S1, thereby optimizing the wiring space.

For example, referring to FIG. 4, a part of the second touch traces L2, connected to the second touch channels 2 in the second sub-region S52, in the second peripheral region S2 is further far away from the touch region S5 than a part of the first touch traces L1, connected to the first touch channels 1 in the second sub-region S52, in the second peripheral region S2, which may prevent the first touch traces L1 from intersecting the second touch traces L2 in the second peripheral region S2, thereby optimizing the wiring space.

Referring to FIG. 4, the display apparatus 1000 further includes a first touch chip 300A and a second touch chip 300B.

In any two sub-regions, the first touch traces L1 connected to the first touch channels 1 and the second touch traces L2 connected to the second touch channels 2 are electrically connected to the first touch chip 300A. In the remaining two sub-regions except for the any two sub-regions, the first touch traces L1 connected to the first touch channels 1 and the second touch traces L2 connected to the second touch channels 2 are electrically connected to the second touch chip 300B.

That is, the first touch chip 300A is configured to transmit touch signals to the touch electrodes (including the first touch electrodes Tx and the second touch electrodes Rx) in the any two sub-regions, and the second touch chip 300B is configured to transmit touch signals to the touch electrodes in the remaining two sub-regions.

It will be noted that the aforementioned "any two sub-regions" refer to any two of the first sub-region S51, the second sub-region S52, the third sub-region S53 and the fourth sub-region S54, such as the first sub-region S51 and the second sub-region S52; the aforementioned "remaining two sub-regions" refer to the remaining two sub-regions among the first sub-region S51, the second sub-region S52, the third sub-region S53 and the fourth sub-region S54, except for the aforementioned any two sub-regions, such as the third sub-region S53 and the fourth sub-region S54.

For example, in some other embodiments, each touch chip (including the first touch chip 300A and the second touch chip 300B) may include at least one socket, and each socket corresponds to the touch traces (including the first touch traces L1 and the second touch traces L2) connected to the touch channels (including the first touch channels 1 and the second touch channels 2) in the same sub-region. That is, the sub-regions are in one-to-one correspondence with the sockets, different sub-regions correspond to different sockets, which is beneficial for the touch chip to implement partition control of different sub-regions.

Figure 7:
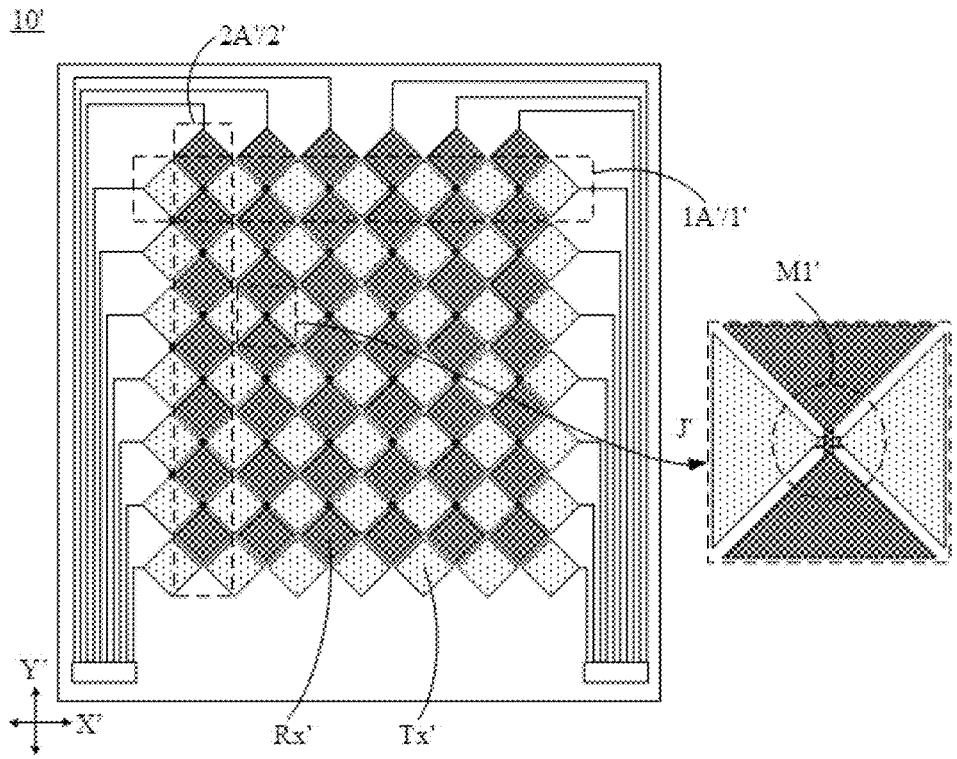
FIG. 7 is a top view of a touch structure, in accordance with the related art.

In the related art, as shown in FIG. 7, the touch structure 10' is designed as a whole on the screen. The touch structure 10' includes a plurality of first touch channels 1' and a plurality of second touch channels 2'. The plurality of first touch channels 1' are arranged in the second direction Y', each first touch channel 1' extends in the first direction X', and the plurality of second touch channels 2' are arranged in the first direction X'. Each second touch channel 2' extends in the second direction Y.

The inventors of the present disclosure through research found that in the touch structure 10' provided on the screen as a whole, an area of the touch channel (the first touch channel 1' or the second touch channel 2') is great, i.e., the facing area between the touch channel and the conductive structure (e.g., the cathode layer 304) of the light-emitting substrate is great, resulting in the great parasitic capacitance between the touch channel and the conductive structure of the light-emitting substrate, i.e., the strong intensity of the generated noise signal, which is easy to interfere with the efficiency of transmitting and receiving of the signals sent by the active pen, which will affect the touch performance of the active pen when touching.

Especially in large-size display apparatuses, the larger the size of the display apparatus 1000, the greater the area of the touch channel in the touch structure 10' provided on the screen as a whole, the greater the parasitic capacitance between the touch channel and the conductive structure of the light-emitting substrate, the stronger the noise signal intensity, which will have a great impact on the touch effect of the active pen.

In the display apparatus 1000 provided by the embodiments of the present disclosure, the touch region S5 is divided into a first sub-region S51, a second sub-region S52, a third sub-region S53 and a fourth sub-region S54, and the touch channels (including the first touch channels Tx and the second touch channels Rx) in different sub-regions in the four sub-regions are set to be insulated from each other, thereby dividing the touch structure 10 into four touch screens. Compared with the touch structure 10' provided on the screen as a whole, among the four touch screens, an area of each touch screen is approximately one quarter of an area of the touch structure 10' provided on the screen as a whole, and an area of the touch channels in each sub-region is approximately one-half of the area of the touch channels in the touch structure provided on the screen as a whole. For example, referring to FIG. 4, the area of the first touch channels 1 in the first sub-region S51 is approximately one-half of the area of the first touch channels 1' (see FIG. 7) of the touch structure 10' provided on the screen as a whole.

Through the foregoing design, an area of the touch channel where each touch electrode (first touch electrode Tx or second touch electrode Rx) is located may be reduced without reducing the effective touch area of the touch structure 10 and ensuring the touch effect; that is, the parasitic capacitance (i.e., the self-capacitance value of the touch electrode) between the touch channel where each touch electrode is located and the conductive structure (e.g., the cathode layer 304) of the light-emitting substrate 20 is reduced. Thus, it is possible to reduce the intensity of the noise signal at the position of each touch electrode, i.e., improve the signal-to-noise ratio when the active pen touches the position of the touch electrode, so as to improve the touch effect of the active pen during the touch process, thereby enhancing the compatibility of the display apparatus 1000, especially the large-size display apparatus, with the active pen, and broadening the application market of the active pen, for example, expanding the application of the active pen in large-size display apparatuses.

In addition, in the display apparatus 1000 provided by the embodiments of the present disclosure, the first touch chip 300A and the second touch chip 300B are provided, and the touch channels in any two sub-regions are set to be electrically connected to the first touch chip 300A, and the touch channels in the two remaining sub-regions are set to be electrically connected to the second touch chip 300B, which may avoid the problem of large chip load of the touch chip due to the case that a single touch chip controls the touch structure 10' provided on the screen as a whole while the effect of reducing the signal-to-noise ratio of the active pen is achieved. That is, it is possible to reduce the load of a single touch chip (including the first touch chip 300A and the second touch chip 300B), and extend the service life of the display apparatus 1000.

In some embodiments, as shown in FIG. 4, the dimensions of the first touch channels 1 located in different sub-regions in the first direction X are substantially equal. The dimensions of the second touch channels 2 located in different sub-regions in the second direction Y are substantially equal. That is, the lengths of the first touch channels 1 in the four sub-regions are substantially equal, and the lengths of the second touch channels 2 in the four sub-regions are substantially equal.

In some embodiments, as shown in FIG. 4, the dimensions of the first touch channels 1 located in different sub-regions in the second direction Y are substantially equal. The dimensions of the second touch channels 2 located in different sub-regions along the first direction X are approximately equal. That is, the widths of the first touch channels 1 in the four sub-regions are substantially equal, and the widths of the second touch channels 2 in the four sub-regions are substantially equal.

By setting the length of the touch channels in different sub-regions to be substantially equal and the width of the touch channels in different sub-regions to be substantially equal, i.e., setting the areas of the touch channels in different sub-regions to be substantially equal, the parasitic capacitances between the touch channels in the different sub-regions and the conductive structures (e.g., the cathode layer 304) of the light-emitting substrate are substantially equal, so that the signal-to-noise ratio of the active pen when touching in different sub-regions is substantially the same, i.e., the floating height and touch sensitivity of the active pen in different sub-regions are substantially uniform, so as to improve the touch effect of the display apparatus 1000.

For example, as shown in FIG. 4, the number of first touch channels 1 located in different sub-regions is substantially equal, and the number of second touch channels 2 located in different sub-regions is substantially equal. Thus, it may also be ensured that the effective touch areas of the four sub-regions are substantially the same; that is, it may be ensured that the areas of the touch channels (including the first touch channels 1 and the second touch channels 2) in the four sub-regions are ensured to be approximately the same. Thus, the signal-to-noise ratio of the active pen when touching on different sub-regions is approximately the same, that is, the floating height and touch sensitivity of the active pen in different sub-regions are approximately uniform, thereby improving the touch effect of the display apparatus 1000.

In some embodiments, as shown in FIG. 4, the first touch channels 1 located in different sub-regions include an equal number of first touch electrodes Tx, and the second touch channels 2 located in different sub-regions include an equal number of second touch electrodes Rx.

By setting the number of touch electrodes (including the first touch electrode Tx and the second touch electrode Rx) in the touch channels (including the first touch channel 1 and the second touch channel 2) in different sub-regions to be substantially equal, so that the areas of the touch channels in different sub-regions are substantially the same, the areas of the touch channels in different sub-regions are substantially equal, so that the parasitic capacitances between the touch channels in different sub-regions and the conductive structure (e.g., the cathode layer 304) of the light-emitting substrate are substantially the same. Thus, the signal-to-noise ratio when the active pen performs touch in different sub-regions is substantially the same, that is, the floating height and touch sensitivity of the active pen in different sub-regions are substantially uniform, thereby improving the touch effect of the display apparatus 1000.

For example, on the basis of the foregoing embodiments, the first touch electrodes Tx in the four sub-regions have substantially the same size and substantially the same shape, and the second touch electrodes Rx in the four sub-regions have substantially the same size and substantially the same shape, which ensures that the areas of the touch channels in different sub-regions are substantially the same, so that the floating height and touch sensitivity of the active pen in different sub-regions are substantially uniform, so as to improve the touch effect of the display apparatus 1000.

In some embodiments, as shown in FIG. 4, centers of two adjacent first touch channels 1 that are respectively located in the first sub-region S51 and the second sub-region S52 are located substantially on a same straight line (e.g., a straight line La shown in FIG. 4) extending in the first direction X, and centers of two adjacent first touch channels 1 that are respectively located in the third sub-region S53 and the fourth sub-region S54 are located substantially on a same straight line extending in the first direction X.

That is, centers of two first touch channels 1 that belong to different sub-regions and are adjacently arranged in the first direction X may be located on a same straight line.

With the foregoing arrangement, it may be ensured that in the touch structure 10 divided into the four sub-regions, the plurality of first touch channels 1 are distributed in an array in the first direction X and the second direction Y, so that the first touch electrodes Tx are evenly distributed in the touch structure 10, so that the touch effect of the touch structure 10 at different positions is substantially the same to improve the user experience of the active pen during the touch process.

For example, referring to FIG. 4, the centers of all the first touch electrodes Tx in the two adjacent first touch channels 1, that are respectively located in the first sub-region S51 and the second sub-region S52, are substantially located on a same straight line (the straight line La shown in FIG. 4) extending in the first direction X. Similarly, the centers of all the first touch electrodes Tx in the two adjacent first touch channels 1, that are respectively located in the third sub-region S53 and the fourth sub-region S54 are substantially located on the same straight line extending in the first direction X. Thus, it is further ensured that the first touch electrodes Tx are evenly distributed in the touch structure 10, thereby improving the user experience of the active pen during the touch process.

In some embodiments, as shown in FIG. 4, centers of two adjacent second touch channels 2 that are respectively located in the first sub-region S51 and the third sub-region S53 are substantially located on a same straight line (a straight line Lb as shown in FIG. 4) extending in the second direction Y, and centers of two adjacent second touch channels 2 that are respectively located in the second sub-region S52 and the fourth sub-region S54 are substantially on a same straight line extending in the second direction Y.

That is, the centers of the two second touch channels 2 that belong to different sub-regions and are adjacently arranged in the second direction Y may be located on a same straight line.

With the above arrangement, it may be ensured that in the touch structure 10 divided into the four sub-regions, the plurality of second touch channels 2 are distributed in an array in the first direction X and the second direction Y, so that the second touch electrodes Rx are evenly distributed in the touch structure 10, so that the touch effect of the touch structure 10 at different positions is substantially the same to improve the user experience of the active pen during the touch process.

For example, referring to FIG. 4, the centers of all the second touch electrodes Rx in two adjacent second touch channels 2, respectively located in the first sub-region S51 and the third sub-region S53, are substantially located on a same straight line (the straight line Lb as shown in FIG. 4) extending in the second direction Y Similarly, the centers of all the second touch electrodes Rx in two adjacent second touch channels 2, respectively located in the second sub-region S52 and the fourth sub-region S54, are substantially located on a same straight line extending in the second direction Y Thus, it is further ensured that the second touch electrodes Rx are evenly distributed in the touch structure 10, thereby improving the user experience of the active pen during the touch process.

It will be noted that the term "center" is the geometric center. For example, the center of the first touch channel 1 is the geometric center of the first touch channel 1, and the center of the first touch electrode Tx is the geometric center of the first touch electrode Tx.

For example, as shown in FIG. 4, two first touch channels 1 that belong to different sub-regions and are adjacently arranged in the first direction X are arranged symmetrically, and a symmetry axis extends substantially in the second direction Y; two second touch channels 2 that belong to different sub-regions and are adjacently arranged in the second direction Y are arranged symmetrically, and a symmetry axis thereof extends substantially in the first direction X.

That is, the first touch channels 1 and the second touch channels 2 are both controlled to be distributed in an array in the first direction X and the second direction Y, and the first touch channels 1 located in different sub-regions are controlled to substantially have the same shape, the same size and the same number, and the second touch channels 2 located in different sub-regions are controlled to substantially have the same shape, the same size and the same number, so that the first touch electrodes Tx and the second touch electrodes Rx are evenly distributed in the touch structure 10, and the signal-to-noise ratio of the position where the touch electrodes (including the first touch electrodes Tx and the second touch electrodes Rx) in different sub-regions are located is substantially the same. As a result, the touch performance of the active pen is optimized and the adaptability of the display apparatus 1000 and the active pen is improved, so that the touch experience of the display apparatus 1000 is improved.

Figure 8:
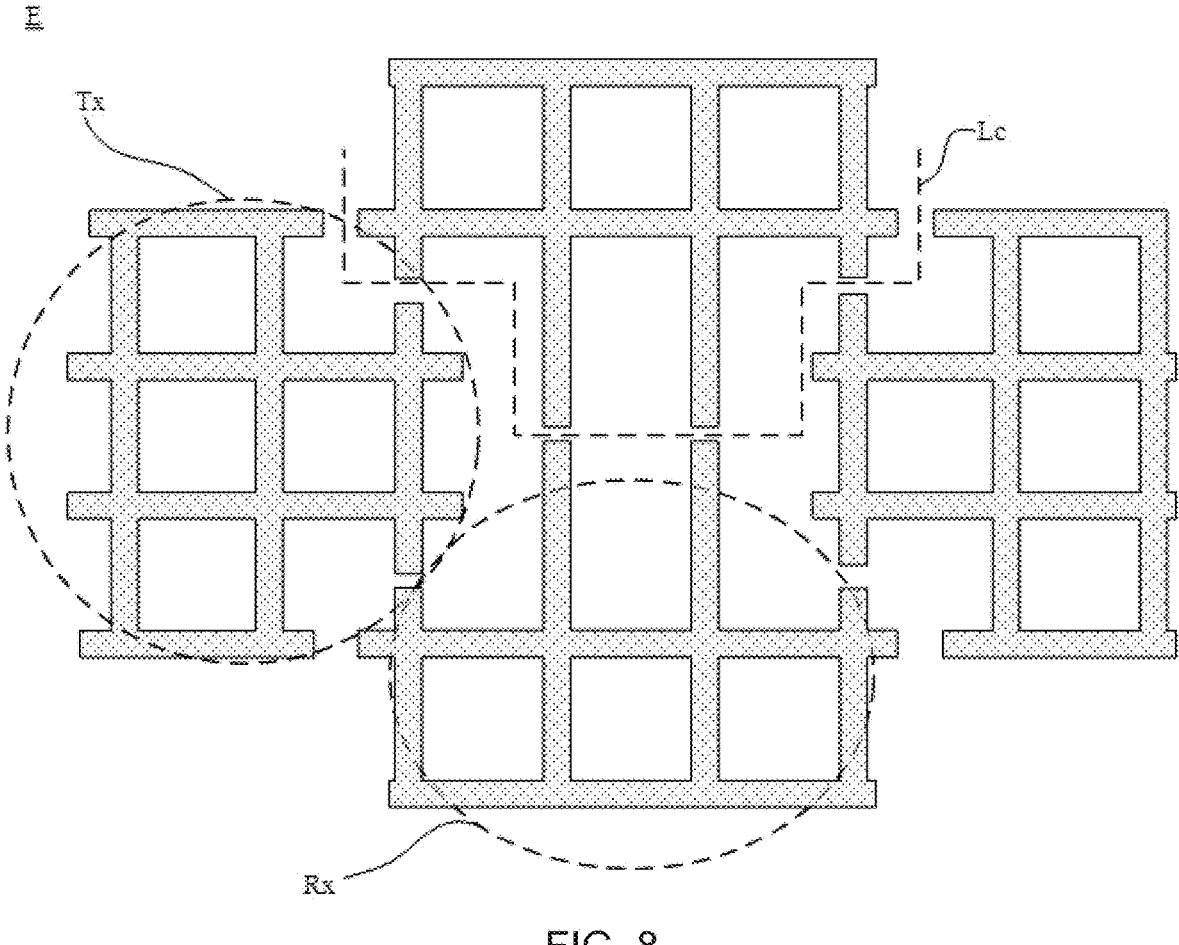
FIG. 8 is an enlarged view of a structure corresponding to the region where the dotted box E in FIG. 6 is located.

In some embodiments, the touch structure 10 of the display apparatus 1000 is of a metal mesh structure (referring to FIGS. 5 and 8). After the touch structure 10 is integrally formed, the metal mesh G is disconnected at the positions where insulation is required, for example, disconnected at the boundaries, adjacent and close to each other, of two sub-regions. The metal mesh is disconnected at a position between two first touch channels 1 that belong to different sub-regions and are adjacently arranged, or a position between two second touch channels 2 that belong to different sub-regions and are adjacently arranged, so that the touch structure 10 is divided into four touch screens insulated from each other.

For example, different first touch channels 1 and different second touch channels 2 are both insulated from each other (for example, insulation is achieved by disconnecting the metal mesh G).

For example, the adjacently arranged first touch electrode Tx and the second touch electrode Rx are also insulated from each other.

In some embodiments, as shown in FIG. 8, two first touch channels 1 that belong to different sub-regions and are adjacently arranged in the first direction X have a gap therebetween, and two second touch channels 2 that belong to different sub-regions and are adjacently arranged in the second direction Y have a gap (for example, the path indicated by the dotted line Lc in FIG. 8) therebetween, and the gap extends in a shape of zigzag.

For example, referring to FIG. 8, the gap is formed by disconnecting the metal lines GL between the two first touch channels 1 and between the two second touch channels 2. For example, the gap is configured such that the two first touch channels 1 are insulated from each other and the two second touch channels 2 are insulated from each other.

For example, at any position that needs to be disconnected, the gap, formed after the metal lines GL between the adjacent first touch electrode Tx and the second touch electrode Rx are disconnected, extends in a shape of a zigzag.

By setting the gap to be in a shape of a zigzag, after the touch structure 10 is divided into four touch screens by four sub-regions, the division boundary between adjacent sub-regions are relatively jagged. Thus, it is possible to avoid the problem of obvious line marks appearing between adjacent sub-regions caused by partition by disconnecting the lines in a straight line with a long distance, i.e., avoid the problem of shadowing in the display process of the display apparatus 1000, thereby improving the display effect of the display apparatus 1000.

In some embodiments, as shown in FIG. 4, in the first sub-region S51 and the second sub-region S52, the first touch traces L1 connected to the first touch channels 1 and the second touch traces L2 connected to the second touch channels 2 are electrically connected to the first touch chip 300A. That is, the touch traces (including the first touch traces L1 and the second touch traces L2) led out from the first sub-region S51 and the second sub-region S52 are electrically connected to the first touch chip 300A, so that the touch screens where the first sub-region S51 and the second sub-region S52 are located realize the touch function through the first touch chip 300A.

The first touch traces L1 connected to the first touch channels 1 and the second touch traces L2 connected to the second touch channels 2 in the third sub-region S53 and the fourth sub-region S54 are electrically connected to the second touch chip 300B. That is, the touch traces (including the first touch traces L1 and the second touch traces L2) led out from the third sub-region S53 and the fourth sub-region S54 are electrically connected to the second touch chip 300B, and the touch screens where the third sub-region S53 and the fourth sub-region S54 are located realizes touch function through the second touch chip 300B.

By setting the first touch chip 300A and the second touch chip 300B to respectively control the touch channels (including the first touch channels 1 and the second touch channels 2) in the two sub-regions, so as to achieve the touch function of the touch structure 10 that is divided into four touch screens, and reduce the load of a single touch chip, so that the service life of the display apparatus 1000 is increased.

Based on the above embodiments, in some embodiments, as shown in FIG. 4, the first touch chip 300A and the second touch chip 300B are both disposed on a side of the fan-out region S4 away from the third peripheral region S3. In the second direction Y, the second touch chip 300B is closer to the fan-out region S4 than the first touch chip 300A.

For example, referring to FIG. 4, the first touch chip 300A and the second touch chip 300B are disposed on the flexible circuit board 200. After the flexible circuit board 200 is bonded to the display panel 100, and before the flexible circuit board 200 is bent, the first touch chip 300A and the second touch chip 300B are located on a side of the fan-out region S4 away from the third peripheral region S3.

Referring to FIG. 4, in the second direction Y, the third sub-region S53 and the fourth sub-region S54 are closer to the fan-out region S4 than the first sub-region S51 and the second sub-region S52. By arranging the second touch chip 300B is closer to the fan-out region S4, the touch traces led out from the third sub-region S53 and the fourth sub-region S54 and electrically connected to the second touch chip 300B are closer to the touch region S5 than the touch traces led out from the first sub-region S51 and the second sub-region S52 and electrically connected to the first touch chip 300A, thereby preventing the touch traces led out from the first sub-region S51 and the second sub-region S52 from intersecting the touch traces led out from the third sub-region S53 and the fourth sub-region S54, so as to optimize the wiring space, reduce the wiring difficulty, and facilitate the thinness and lightness of the display apparatus 1000.

It will be noted that the display apparatus 1000 provided by the embodiments of the present disclosure is not limited to the arrangement and connection methods of the touch chips described in the above embodiments. For example, the first touch chip 300A may also be electrically connected to the first touch traces L1 that are connected to the first touch channels 1 and the second touch traces L2 that are connected to the second touch channels 2 in the first sub-region S51 and the third sub-region S53, and the second touch chip 300B may be electrically connected to the first touch traces L1 that are connected to the first touch channels 1 and the second touch traces L2 that are connected to the second touch channels 2 in the second sub-region S52 and the fourth sub-region S54.

For example, in the case where the first touch chip 300A is electrically connected to the touch traces led out from the first sub-region S51 and the third sub-region S53, and the second touch chip 300B is electrically connected to the touch traces led out from the second sub-region S52 and the fourth sub-region S54, in the second direction Y, the second touch chip 300B is closer to the second peripheral region S2 than the first touch chip 300A, thereby preventing the touch traces from intersecting to optimize the wiring space.

In some embodiments, as shown in FIG. 4, a part of the first touch traces L1 located in the first peripheral region S1 is arranged closer to the touch region S5 than a part of the second touch traces L2 located in the first peripheral region S1; a part of the first touch traces L1 located in the second peripheral region S2 is arranged closer to the touch region S5 than a part of the second touch traces L2 located in the second peripheral region S2.

Referring to FIG. 4, the second touch traces L2 led out from the first sub-region S51 and the second sub-region S52 pass through the first peripheral region S1 and the second peripheral region S2 respectively, and finally extend to the fan-out region S4. With such the arrangement, it is possible to prevent the first touch traces L1 from intersecting the second touch traces L2, thereby optimizing the wiring space and reducing the wiring difficulty.

Figure 9:
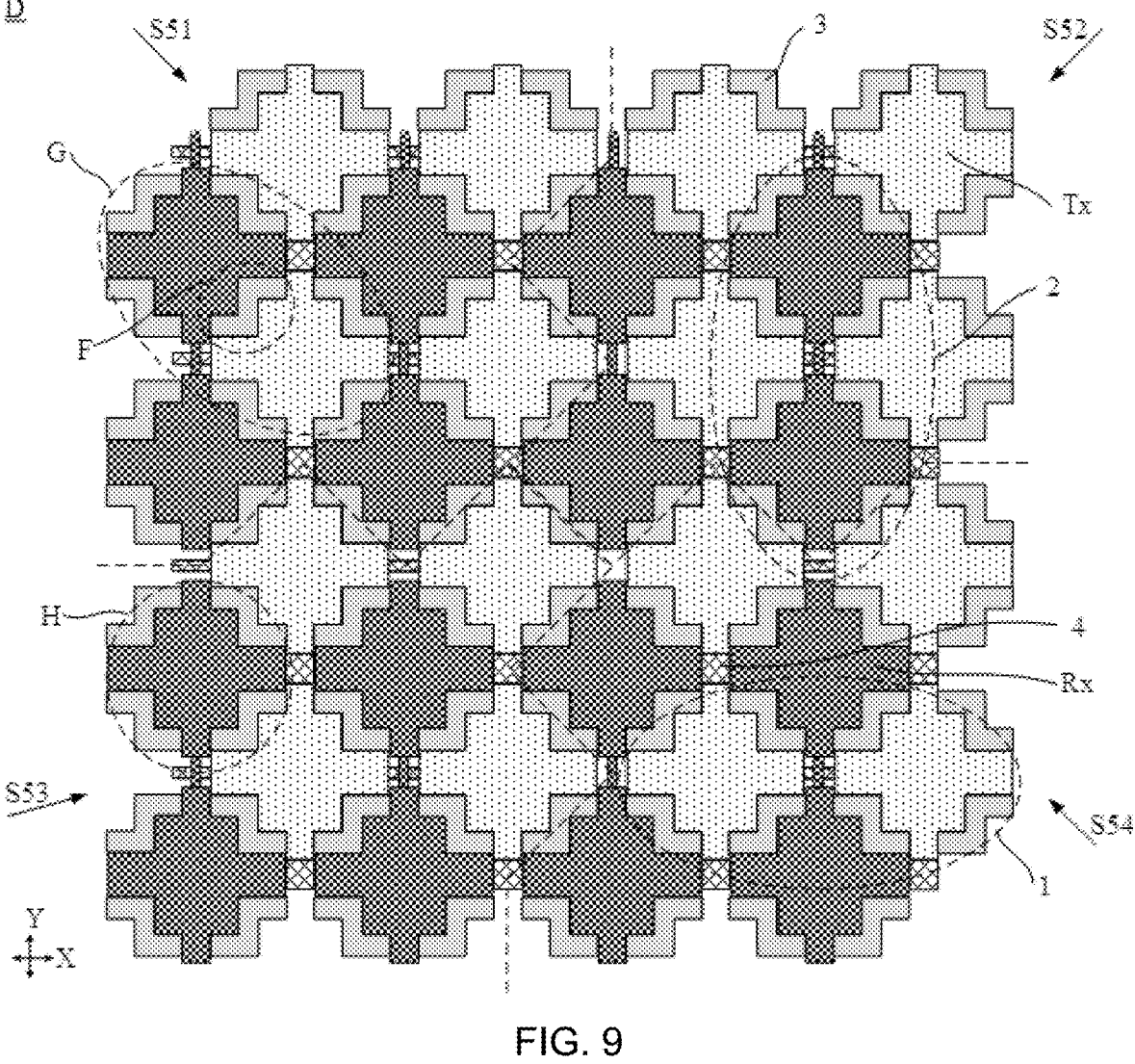
FIG. 9 is another enlarged view of a structure corresponding to the region where the dotted box D in FIG. 4 is located.

In some embodiments, as shown in FIG. 9, the display apparatus 1000 further includes first dummy electrodes 3. For example, the touch structure 10 of the display apparatus 1000 includes the first dummy electrodes 3.

Figure 10:
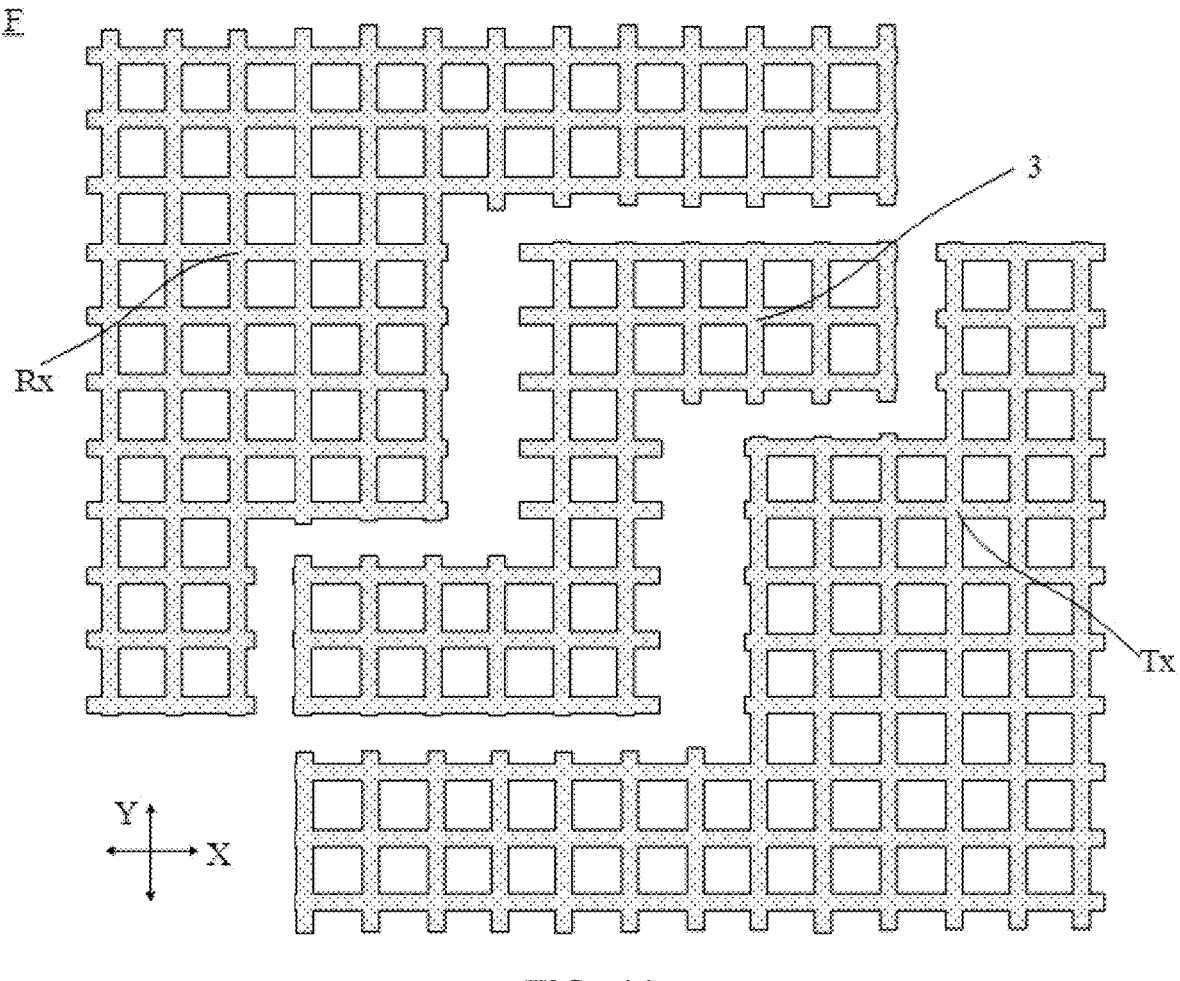
FIG. 10 is an enlarged view of a structure corresponding to the region where the dotted box F in FIG. 9 is located.

Referring to FIGS. 9 and 10, the first dummy electrode 3 is disposed between the adjacent first touch electrode Tx and the second touch electrode Rx, and is insulated from both the first touch electrode Tx and the second touch electrode Rx.

For example, referring to FIG. 10, the first touch electrode Tx, the second touch electrode Rx and the first dummy electrode 3 are all of a metal mesh structure.

For example, after the first touch electrode Tx, the second touch electrode Rx and the first dummy electrode 3 are integrally formed, the metal lines GL are disconnected at the positions where insulation are required. For example, referring to FIG. 10, the metal lines GL between the first touch electrode Tx and the adjacent first dummy electrode 3 are disconnected, thereby achieving insulation between the first touch electrode Tx and the first dummy electrode 3.

Referring to FIG. 10, a border of the first dummy electrode 3 proximate to the first touch electrode Tx and a border of the first dummy electrode 3 proximate to the second touch electrode Rx are both in a shape of zigzag; borders of the first dummy electrode 3 and the first touch electrode Tx that are close to each other match to each other in shape, and borders of the first dummy electrode 3 and the second touch electrode Rx that are close to each other match to each other in shape.

That is, a shape of the gap between the first touch electrode Tx and the second touch electrode Rx matches a shape of the first dummy electrode 3. For example, the gap between the first touch electrode Tx and the second touch electrode Rx is substantially filled with the first dummy electrode 3.

By providing the first dummy electrode 3 and setting the border of the first dummy electrode 3 to match the border of the touch electrode (including the first touch electrode Tx and the second touch electrode Rx) proximate to the first dummy electrode 3, the gap between the first touch electrode Tx and the second touch electrode Rx is substantially filled with the first dummy electrode 3. Thus, it is possible to reduce the areas of the first touch electrode Tx and the area of the second touch electrode Rx while the size of the entire screen of the touch structure 10 remains unchanged, which may reduce the initial mutual capacitance value of the entire touch structure 10, i.e., the mutual capacitance value of the touch structure 10 when the finger is not touching, thereby improving the touch sensitivity of the touch structure 10 and optimizing the touch effect. In addition, it is possible to reduce the heat generated by the touch structure 10, thereby preventing the display apparatus 1000 from suffering large losses due to temperature changes. For example, it may be possible to prevent the problem of ghost points caused by the large temperature changes of certain materials of the display apparatus 1000, such as the polarizer 500 and other structures. In addition, reducing the area of the touch electrode may reduce the parasitic capacitance between the touch electrode and the cathode layer 304, thereby improving the signal-to-noise ratio of the active pen and further optimizing the touch effect of the active pen.

Figure 11:
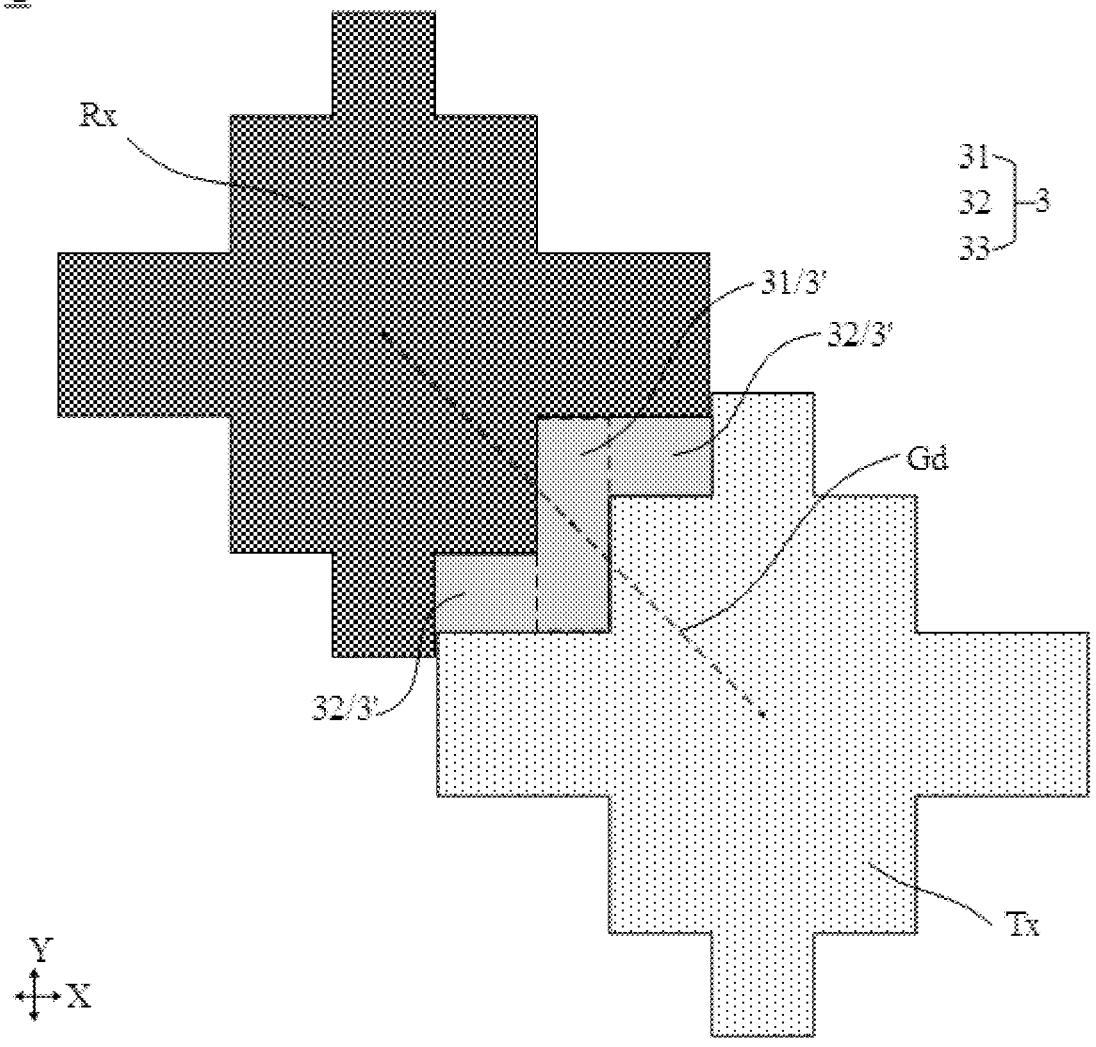
FIG. 11 is an enlarged view of a structure corresponding to the region where the dotted box G in FIG. 9 is located.

In some embodiments, as shown in FIGS. 9 and 11, the first dummy electrode 3 is in a shape of a center symmetric pattern. That is, the border of the first dummy electrode 3 proximate to the first touch electrode Tx and the border of the first dummy electrode 3 proximate to the second touch electrode Rx are substantially symmetrical, so that the shapes of the first touch electrode Tx and the second touch electrode Rx are substantially the same. As a result, the touch electrodes in the touch structure 10 are arranged regularly.

Based on the above embodiments, in some embodiments, as shown in FIG. 11, a midpoint of a connection line (the dotted line Gd as shown in FIG. 11) between a center of the first touch electrode Tx adjacent to the first dummy electrode 3 and a center of the second touch electrode Rx adjacent to the first dummy electrode 3 coincides with a center of the first dummy electrode 3. Thus, the areas of the first touch electrode Tx and the second touch electrode Rx are substantially the same, and the noise signals of the touch structure 10 at different positions are relatively uniform, so that the signal-to-noise ratio of the active pen at different positions during the touch process is substantially the same. As a result, the touch performance of the active pen is optimized; for example, the floating height of the active pen is uniform.

It will be noted that the term "center" may be a geometric center. For example, the center of the first dummy electrode 3 is the geometric center of the first dummy electrode 3.

For example, the first dummy electrode 3 is centrally symmetrically arranged with its own center as the center of symmetry.

For example, the first touch electrode Tx and the second touch electrode Rx are arranged centrally symmetrically with the center of the first dummy electrode as the center of symmetry.

In some embodiments, as shown in FIG. 11, the first dummy electrode 3 includes a plurality of extension portions 3' connected in sequence, each extension portion 3' is in a shape of a strip, and extension directions of any two adjacent extension portions 3' intersect.

By providing the plurality of strip-shaped extension portions 3', and setting the extension directions of any two adjacent extension portions 3' to intersect, the first dummy electrode 3 is in a shape of a zigzag as a whole, so that the borders formed after the metal lines GL between the first dummy electrode 3 and the first touch electrode are disconnected are relatively jagged. Thus, it is possible to avoid the problem of obvious line marks appearing between the first dummy electrode 3 and the touch electrode caused by disconnecting the lines in a straight line with a long distance; i.e., avoid the problem of shadowing in the display process of the display apparatus 1000, thereby improving the display effect of the display apparatus 1000.

In some embodiments, as shown in FIG. 11, the first dummy electrode 3 includes a first extension portion 31 and two second extension portions 32 respectively located at two ends of the first extension portion 31 and connected to the first extension portion 31. The first extension portion 31 extends substantially in the second direction Y, and the second extension portions 32 each extend substantially in the first direction X.

That is, the first dummy electrode 3 is substantially in a shape of "Z" as a whole. By providing the "Z"-shaped first dummy electrode 3, the borders of the first touch electrode Tx and the second touch electrode Rx are all substantially in a shape of "Z". Thus, it is possible to avoid the problem of shadowing in the display process of the display apparatus 1000, and may also avoid the situation of jitter of the active pen during the touch process caused by the case that the border of the touch electrode is too jagged. That is, it is possible to achieve both the effect of avoiding the problem of shadowing and the effect of improving the linearity of the active pen.

In some embodiments, the plurality of extension portions 3' substantially have an equal length. For example, a dimension of the first extension portion 31 in the second direction Y is substantially equal to a dimension of the second extension portion 32 in the first direction X. Thus, the shape of the first dummy electrode 3 is a regular pattern, which is substantially the same as the shape of the touch electrode matched with the first dummy electrode 3, so that the difficulty of manufacturing the touch structure 10 is reduced.

In some embodiments, the first dummy electrode 3 is in a shape of a strip, and a width of the first dummy electrode at different positions in a length direction of the first dummy electrode 3 is substantially equal. For example, a dimension of the first extension portion 31 in the first direction X is substantially equal to a dimension of the second extension portion 32 in the second direction Y Thus, the shape of the first dummy electrode 3 is a regular pattern, which is substantially the same as the shape of the touch electrode matched with the first dummy electrode 3, so that the difficulty of manufacturing the touch structure 10 is reduced.

Figure 12:
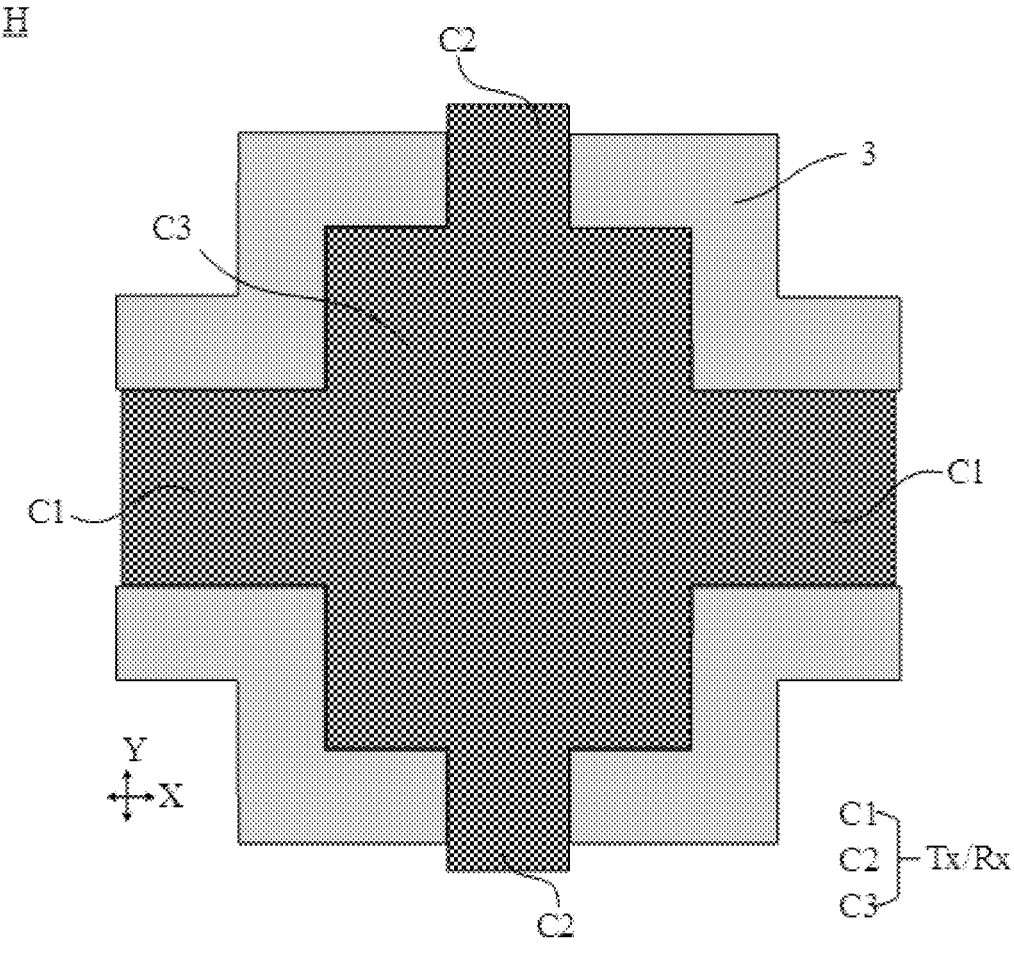
FIG. 12 is an enlarged view of a structure corresponding to the region where the dotted box H in FIG. 9 is located.

In some embodiments, as shown in FIGS. 9 and 12, four first dummy electrodes 3 are arranged around the first touch electrode Tx, and the four first dummy electrodes 3 are centrally symmetrically arranged with respect to a center of the first touch electrode Tx; four first dummy electrodes 3 are arranged around the second touch electrode Rx, and the four first dummy electrodes 3 are centrally symmetrically arranged with respect to a center of the second touch electrode Rx.

According to the above embodiments, the shapes of the first touch electrode Tx and the second touch electrode Rx and the areas of the first touch electrode Tx and the second touch electrode Rx may be made substantially the same, so that the noise signals of the touch structure 10 at different positions are substantially the same. Thus the signal-to-noise ratio of the active pen at different positions of the touch structure 10 during the touch process is substantially the same, which may improve the touch performance of the active pen, for example, make the floating height of the active pen uniform.

For example, four first dummy electrodes 3 are arranged around each touch electrode.

In some embodiments, as shown in FIG. 12, each of the first touch electrode Tx and the second touch electrode Rx includes a main body portion C3, two first protruding portions C1, and two second protruding portions C2.

As shown in FIG. 12, the main body portion C3 is in a shape of a rectangle, two first protruding portions C1 are disposed on two sides of the main body portion C3 in the first direction X, and the two second protruding portions C2 are disposed on two sides of the main body portion C3 in the second direction Y The two first protruding portions C1 and the two second protruding portions C2 are all connected to the main body portion C3.

For example, the borders of the main body portion C3, the two first protruding portions C1, and the two second protruding portions C2 are all in a shape of a smooth straight line.

For example, the two first protruding portions C1 have substantially the same size and the same shape.

For example, the two second protruding portions C2 have substantially the same size and the same shape.

For example, the first protruding portion C1 and the second protruding portion C2 have substantially the same size and the same shape.

With the above embodiments, the first touch electrode Tx and the second touch electrode Rx are both substantially in a shape of a Chinese character "十", which may ensure that the borders between the first touch electrode Tx and the second touch electrode Rx has fewer bend, so as to ensure the linearity of the active pen when touching the display apparatus 1000, and avoid the problem of shadowing caused by disconnecting the lines in a straight line with a long distance.

In some embodiments, as shown in FIG. 9, the display apparatus 1000 further includes second dummy electrodes 4. For example, the touch structure 10 of the display apparatus 1000 includes the second dummy electrodes 4.

The second dummy electrode 4 is disposed between two adjacent first touch electrodes Tx that belong to different first touch channels 1 and between two adjacent second touch electrodes Rx that belong to different second touch channels 2. The second dummy electrode 4 is insulated from the first touch electrodes Tx and the second touch electrodes Rx. That is, the second dummy electrode 4 is configured to surround the touch electrode with the first dummy electrodes 3 together, thereby separating the first touch electrode Tx and the second touch electrode Rx.

For example, the second dummy electrode 4 may be connected to the first dummy electrode 3.

For example, the second dummy electrode 4 is in a shape of a metal mesh.

For example, as shown in FIG. 9, the second dummy electrode 4 is in a shape of a rectangle.

Based on the above embodiments in which the touch structure 10 is divided into four touch screens and the embodiments in which the first dummy electrodes 3 and the second dummy electrodes 4 are provided, the embodiments of the present disclosure provide a display apparatus 1000 that capable of improving the touch accuracy of the active pen.

Figure 13:
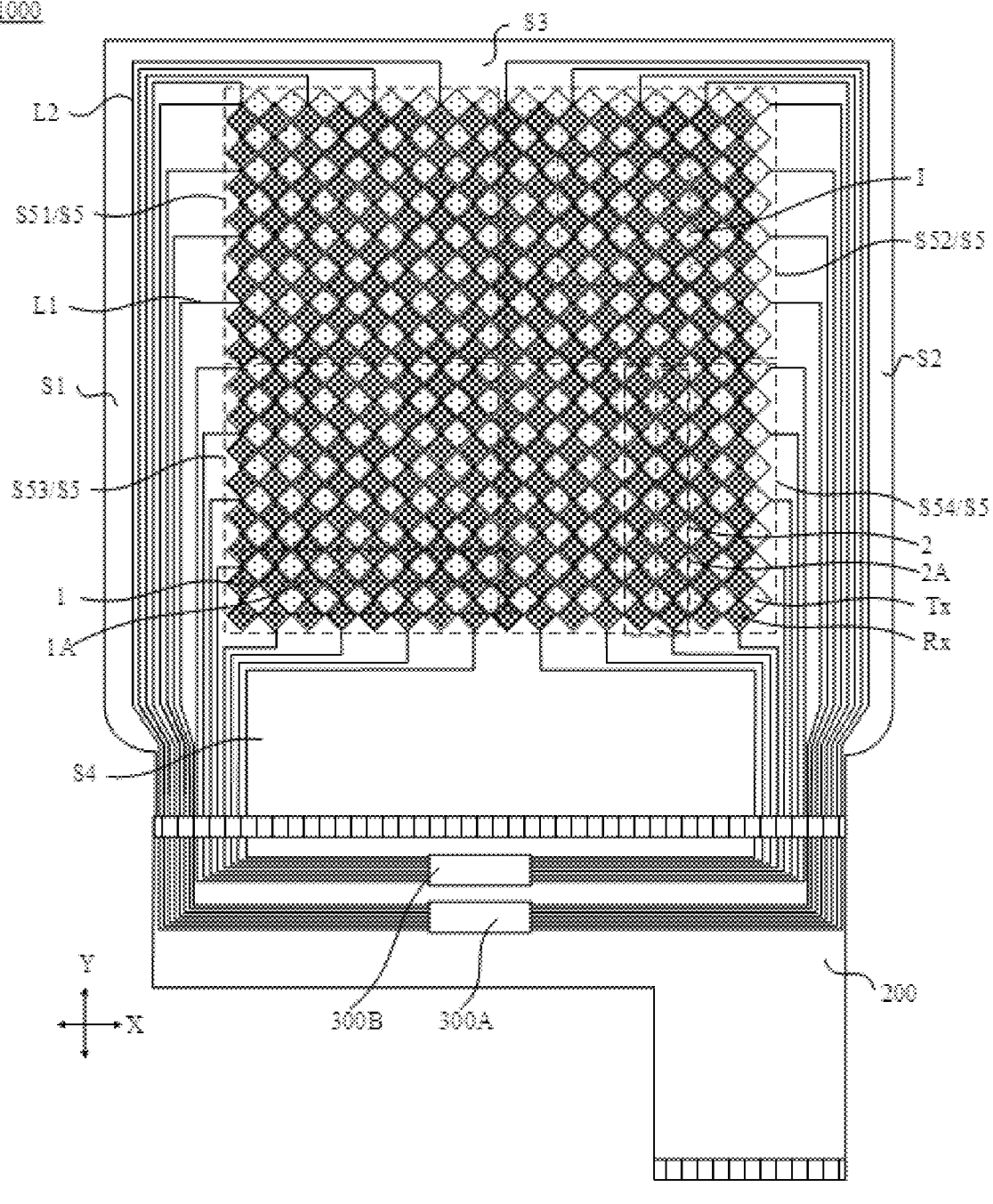
FIG. 13 is a top view of yet another display apparatus, in accordance with some embodiments.

In some embodiments, as shown in FIG. 13, the at least one first touch channel 1 in each sub-region includes a plurality of first sub-channels 1A; the plurality of first sub-channels 1A are arranged in the second direction Y, and each first sub-channel 1A extends in the first direction X; the first sub-channel 1A includes multiple first touch electrodes Tx that are electrically connected. For example, referring to FIG. 13, a first touch channel 1 includes two first sub-channels 1A. For example, referring to FIG. 14, a first touch channel 1 includes four first sub-channels 1A.

As shown in FIG. 13, the at least one second touch channel 2 in each sub-region includes a plurality of second sub-channels 2A; the plurality of second sub-channels 2A are arranged in the first direction X, and each second sub-channel 2A extends in the second direction Y; the second sub-channel 2A includes multiple second touch electrodes Rx that are electrically connected. For example, referring to FIG. 13, a second touch channel 2 includes two second sub-channels 2A. For example, referring to FIG. 14, a second touch channel 2 includes four second sub-channels 2A.

Based on the above embodiments, the plurality of first sub-channels 1A included in the same first touch channel 1 are electrically connected, and the plurality of second sub-channels 2A included in the same second touch channel 2 are electrically connected.

Figure 14:
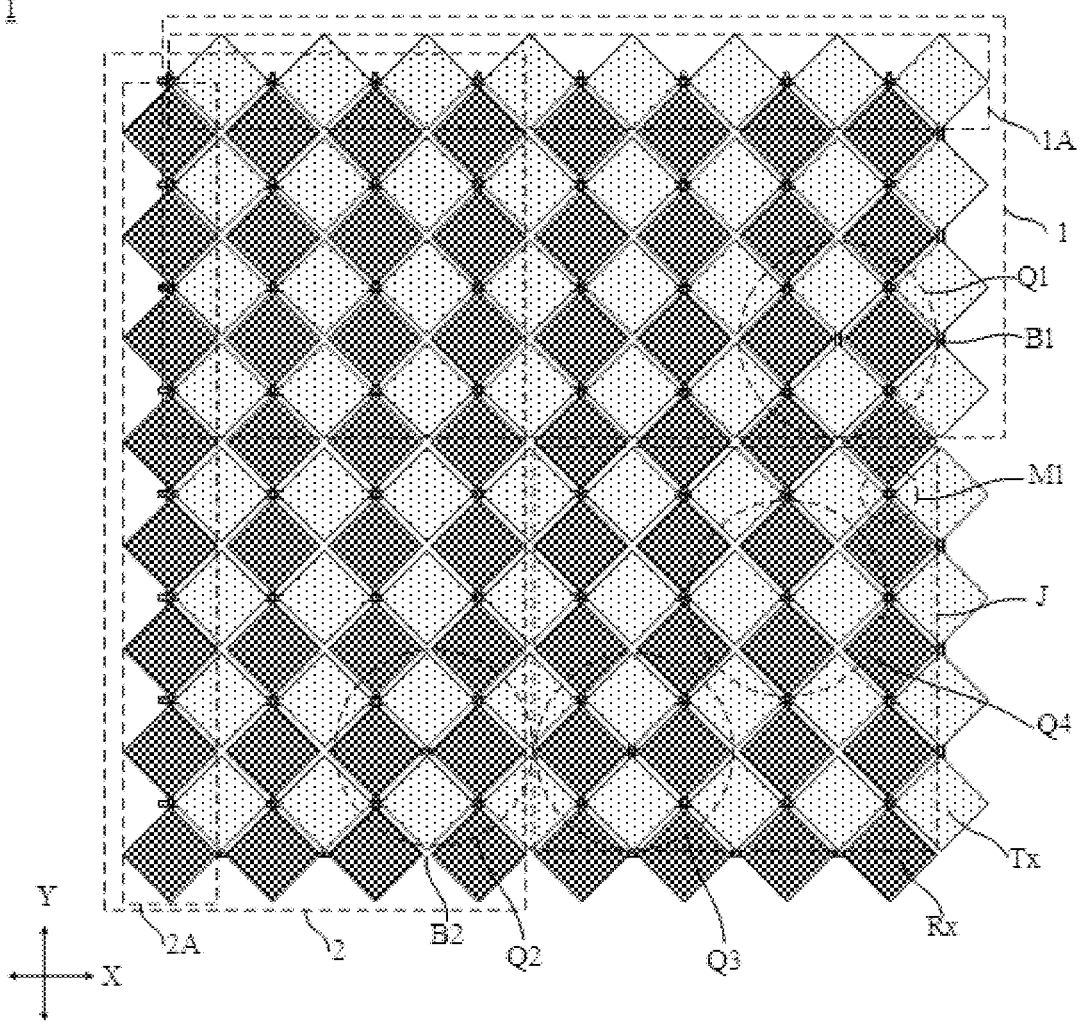
FIG. 14 is an enlarged view of a structure corresponding to the region where the dotted box I in FIG. 13 is located.

For example, referring to FIG. 14, in the same first touch channel 1, two first touch electrodes Tx belonging to two different and adjacent first sub-channels 1A are electrically connected, thereby achieving the purpose that the plurality of first sub-channels 1A in the same first touch channel 1 are electrically connected.

For example, in the same first touch channel 1, two adjacent first sub-channels 1A may be electrically connected to a same touch line M, thereby achieving the purpose that the plurality of first sub-channels 1A in the same first touch channel 1 are electrically connected.

For example, referring to FIG. 14, in the same second touch channel 2, two second touch electrodes Rx belonging to two different and adjacent second sub-channels 2A are electrically connected, thereby achieving the purpose that the plurality of second sub-channels 2A in the same second touch channel 2 are electrically connected.

For example, in the same second touch channel 2, two adjacent second sub-channels 2A may be electrically connected to a same touch line M, thereby achieving the purpose that the plurality of second sub-channels 2A in the same second touch channel 2 are electrically connected.

Referring to FIG. 14, in the display apparatus 1000 provided by the embodiments of the present disclosure, the first touch channel 1 is located in a first rectangular region extending in the first direction X, and the second touch channel 2 is located in a second rectangular region extending in the second direction Y.

It will be noted that the term "first rectangular region" is a region where the first touch electrodes Tx in the first touch channel 1 are located. The first rectangular region capable of including a rectangular region with the smallest area of all the first touch electrodes Tx in the same first touch channel 1. The term "second rectangular region" is a region where the second touch electrodes Rx in the second touch channel 2 are located. The second rectangular region is capable of including a rectangular region with the smallest area of all the second touches electrode Rx in the same second touch channel 2.

Referring to FIG. 14, a rectangular region where the first rectangular region and the second rectangular region intersect is a touch unit region J. That is, the touch unit region J is an intersection region of the first touch channel 1 and the second touch channel 2.

Referring to FIG. 14, in the touch unit region J, the intersection position of the first sub-channel 1A and the second sub-channel 2A may be a touch point M1.

In the related art, as shown in FIG. 7, only one sub-channel (the first sub-channel 1A' or the second sub-channel 2A') is arranged in each touch channel (the first touch channel 1' or the second touch channel 2') of the display apparatus 1000'. Referring to FIG. 7, the intersection position of a first touch channel 1' and a second touch channel 2' is a touch point M1'; there is only one intersection position in a touch unit region J'; that is, there is only one touch point M1'; when a finger touches the touch unit region J', the mutual capacitance value of the touch electrodes at the intersection position will change, thereby detecting the touch position of the finger to achieve the touch function of the touch structure 10'.

In the related art, the magnitude of the area of the touch unit region J' in the touch structure 10' matches the size of the finger. For example, the area of a touch unit region J' is approximately 4×4 mm², which is substantially the same as the contact area of the finger and the screen, so that the accuracy when the finger touching is high.

However, the inventors of the present disclosure found that the size of the tip of the active pen is small. For example, the size of the tip of the active pen is approximately a quarter of the finger or even smaller (for example, the size of the tip of the active pen is 1 mm). In a case where the active pen is applied to the display apparatus 1000' in the related art, the area of the touch unit region J' is much greater than the size of the tip of the active pen tip, resulting in the sharply reduction of the accuracy of the active pen, which is not conducive to the application of the active pen.

In the touch structure 10 provided by the embodiments of the present disclosure, a plurality of adjacent sub-touch channels (including the first sub-touch channels 1A and the second sub-channels 2A) are provided in at least one touch channel (including the first touch channel 1 or the second touch channel 2), and the plurality of sub-touch channels in the same touch channel are electrically connected, so that the touch unit region J includes multiple intersection positions between multiple first sub-channels 1A and multiple second sub-channels 2A, that is, the touch unit region J includes multiple touch points M1. As a result, it is possible to ensure the compatibility between the finger touch and the display apparatus 1000 without changing the area of the touch unit region J in the touch structure 10. In addition, the touch unit region J is divided into a plurality of touch points M1 that match the size of tip of the active pen, which greatly improves the accuracy of the active pen and ensures the touch function of active pen in display apparatus 1000.

Figure 15:
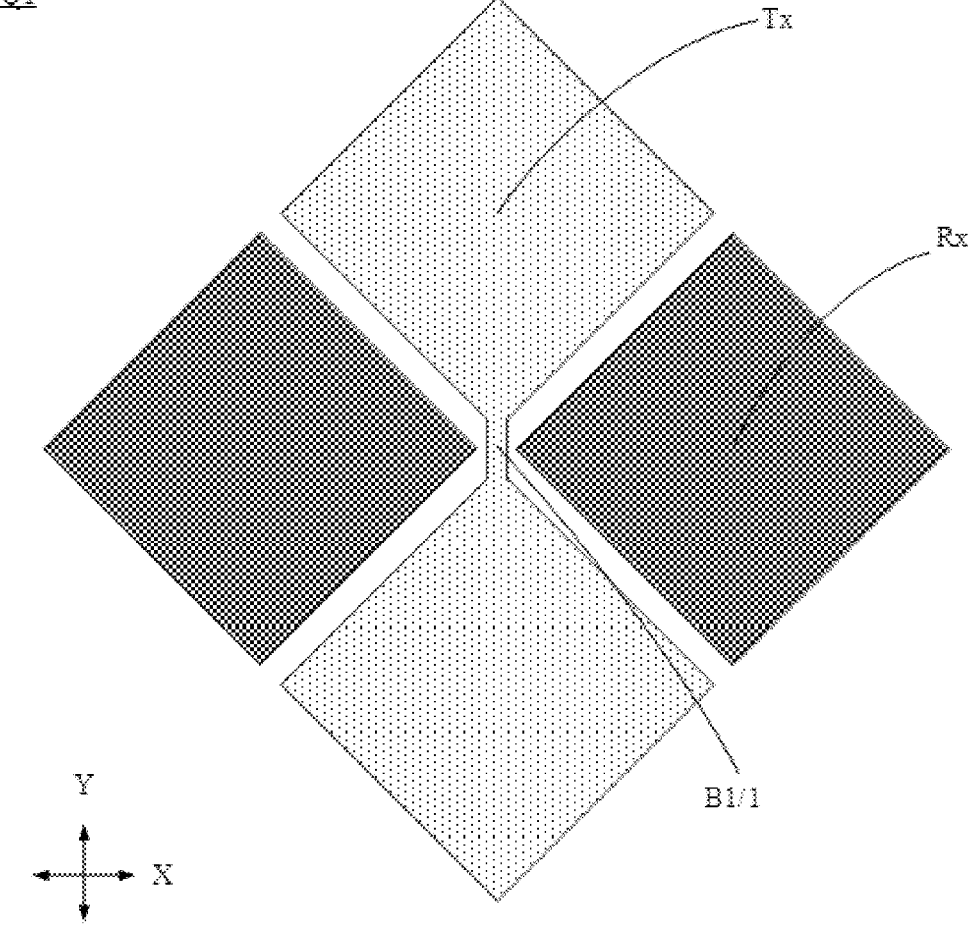
FIG. 15 is an enlarged view of a structure corresponding to the region where the dotted box Q1 in FIG. 14 is located.
Figures 17, 18:
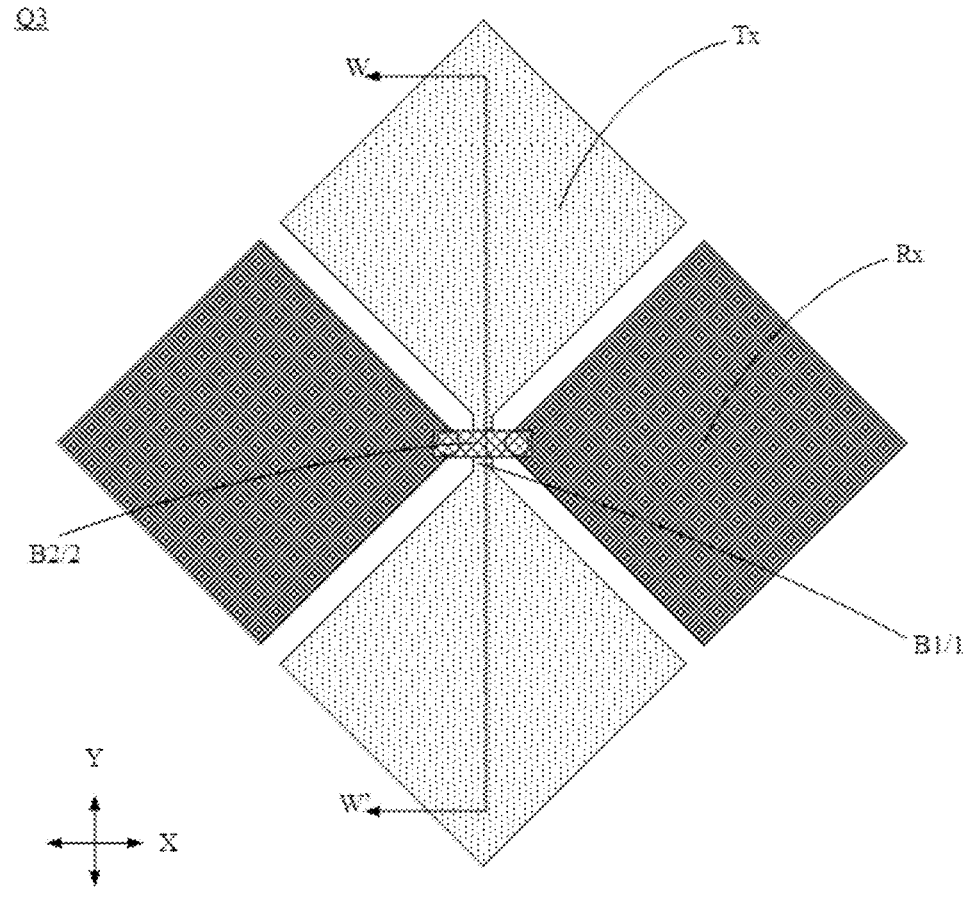
FIG. 17 is an enlarged view of a structure corresponding to the region where the dotted box Q3 in FIG. 14 is located.
FIG. 18 is a sectional view taken along the section line W-W in FIG. 17.

In some embodiments, as shown in FIGS. 14, 15 and 17, in the same first touch channel 1, two first touch electrodes Tx adjacent in the second direction Y in at least one pair are electrically connected.

It will be noted that the above term "at least one pair" refers to two first touch electrodes Tx that belong to different first sub-channels 1A and are adjacently arranged in the second direction Y in the same first touch channel 1.

For example, referring to FIGS. 14, 15 and 17, in the same first touch channel 1, two first touch electrodes Tx belonging to two different and adjacent first sub-channels 1A are electrically connected, thereby achieving the purpose of electrical connection between two adjacent first sub-channels 1A in the same first touch channel 1.

At least one pair of first touch electrodes Tx arranged adjacently in the second direction Y are set to be electrically connected, so that the plurality of first sub-channels 1A located in the same first touch channel 1 are electrically connected. Thus, the plurality of first sub-channels 1A located in the same first touch channel 1 transmit the same touch signal to prevent from increasing or decreasing the size of the first touch channel 1, thereby avoiding the changes in the area of the touch unit region J to ensure the compatibility between finger touch and display apparatus 1000.

Figure 16:
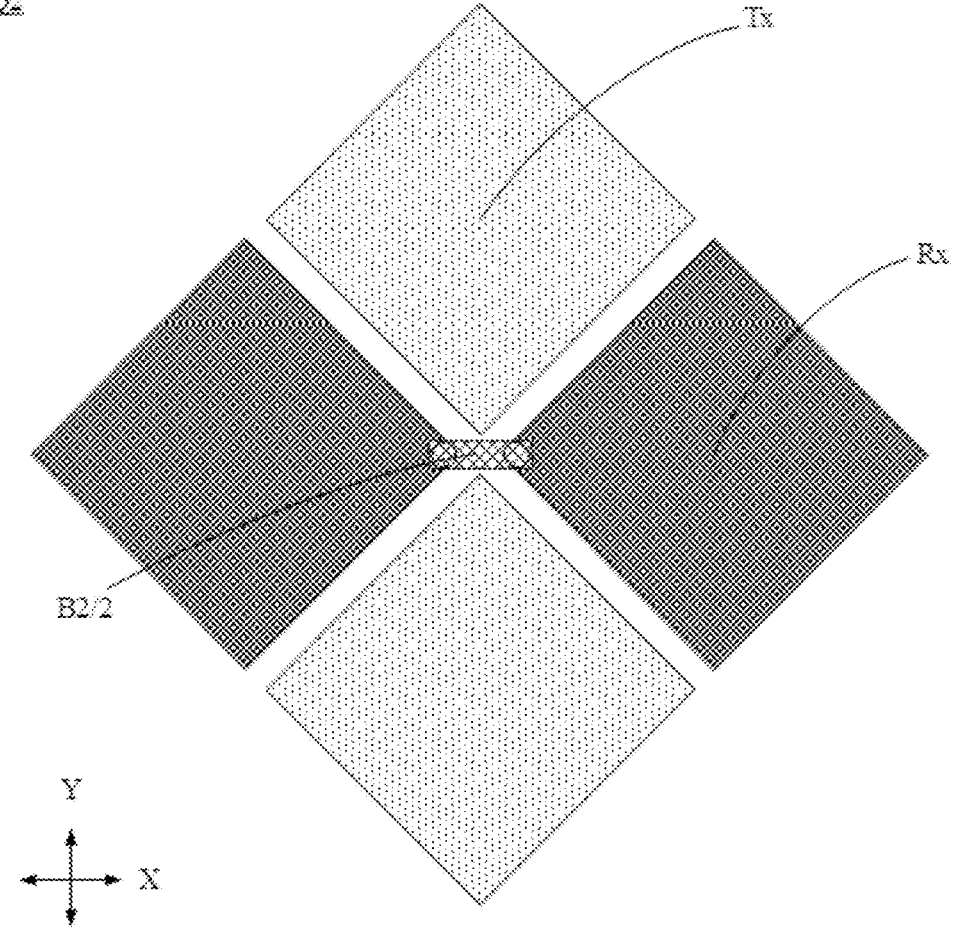
FIG. 16 is an enlarged view of a structure corresponding to the region where the dotted box Q2 in FIG. 14 is located.

In some embodiments, as shown in FIGS. 14, 16 and 17, in the same second touch channel 2, two second touch electrodes Rx adjacent in the first direction Y in at least one pair are electrically connected.

It will be noted that the term "at least one pair" refers to two second touch electrodes Rx that belong to different second sub-channels 2A in the same second touch channel 2 and are adjacently arranged in the first direction X.

For example, referring to FIG. 14, in the same second touch channel 2, two second touch electrodes Rx belonging to two different and adjacent second sub-channels 2A are electrically connected, thereby achieving the purpose of electrical connection between two adjacent second sub-channels 2A in the same second touch channel 2.

Second touch electrodes Rx adjacent in the first direction X in at least one pair are electrically connected, so that multiple second sub-channels 2A in the same second touch channel 2 are electrically connected. Thus, multiple second sub-channels 2A in the same second touch channel 2 transmit the same touch signal to prevent from increasing or decreasing the size of the second touch channel 2, thereby avoiding the changes in the area of the touch unit region J to ensure the compatibility between the finger touch and display apparatus 1000.

In some embodiments, as shown in FIGS. 14, 15 and 17, the first touch channel 1 further includes first connection portions B1. In the same first touch channel 1, two first touch electrodes Tx adjacent in the second direction Y in at least one pair are electrically connected through a first connection portion B1.

For example, referring to FIGS. 14, 15 and 17, the first connection portion B1 extends substantially in the second direction Y.

For example, the first touch electrode Tx and the first connection portion B1 may be integrally arranged.

For example, in the same first touch channel 1, at least one first connection portion B1 may be included.

In the same first touch channel 1, two first touch electrodes Tx adjacent in the second direction Y in at least a pair are electrically connected through the first connection portion B1, so that the plurality of first sub-channels 1A located in the same first touch channel 1 are electrically connected.

In some embodiments, as shown in FIGS. 14, 16 and 17, the second touch channel 2 further includes second connection portions B2; in the same second touch channel 2, two second touch electrodes Rx adjacent in the first direction X in at least one pair are electrically connected through the second connection portion B2.

For example, referring to FIGS. 14, 16 and 17, the second connection portion B2 extends substantially in the first direction X.

For example, the second touch electrode Rx and the second connection portion B2 may be integrally arranged.

For example, in the same second touch channel 2, at least one second connection portion B2 may be included.

In the same second touch channel 2, two second touch electrodes Rx adjacent in the first direction X in at least one pair are electrically connected through the second connection portion B2, so that the plurality of second sub-channels 2A in the same second touch channel 2 are electrically connected.

In some embodiments, as shown in FIG. 18, the display apparatus 1000 includes a first conductive layer 10A, an insulating layer 10B and a second conductive layer 10C that are stacked.

The insulating layer 10B is located between the first conductive layer 10A and the second conductive layer 10C, and the insulating layer 10B is provided with a plurality of via holes H therein.

The first touch electrodes Tx and the second touch electrodes Rx are located in the first conductive layer 10A.

Figure 19:
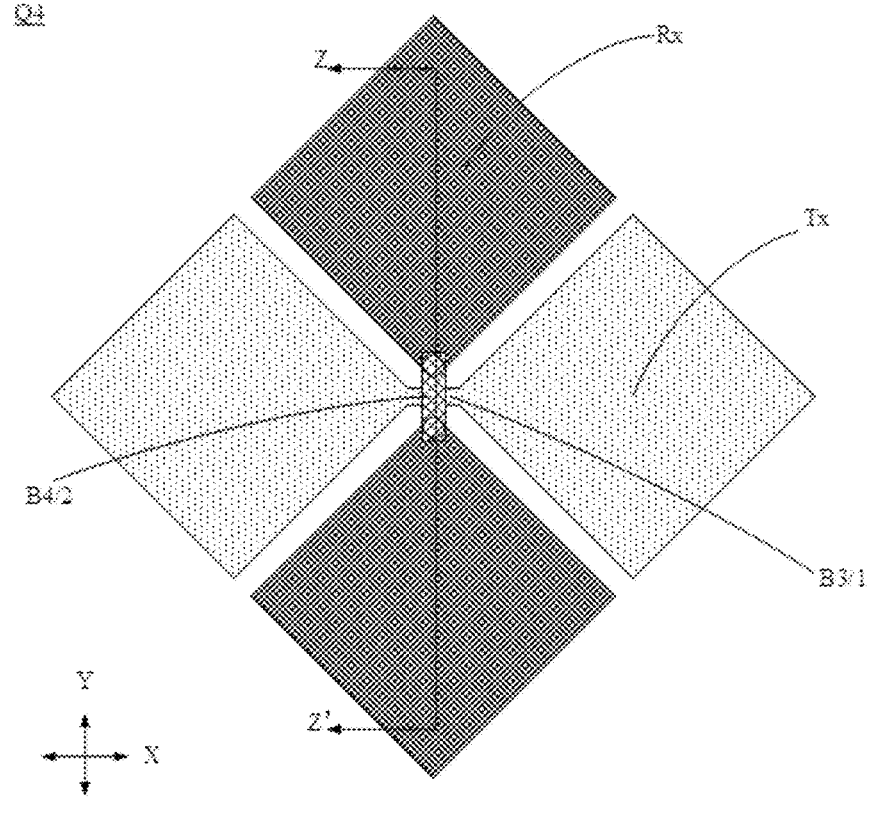
FIG. 19 is an enlarged view of a structure corresponding to the region where the dotted box Q4 in FIG. 14 is located.

In some exemplary embodiments, referring to FIG. 19, the first touch channel 1 includes a third connection portion B3; in the first direction X, any two adjacent first touch electrodes Tx are electrically connected through the third connection portion B3. The second touch channel 2 further include a fourth connection portion B4; in the second direction Y, any two adjacent second touch electrodes Rx are electrically connected through the second connection portion B4. The third connection portion B3 and the fourth connection portion B4 cross.

At the intersection of the third connection portion B3 and the fourth connection portion B4, the insulating layer 10B is used to separate the third connection portion B3 and the fourth connection portion B4, thereby achieving electrical connection of the touch electrodes in the same touch channel, and avoiding the problem of crosstalk of the touch signals transmitted on the first touch electrodes Tx and the second touch electrodes Rx caused by the electrical conduction at the intersection.

Figure 20:
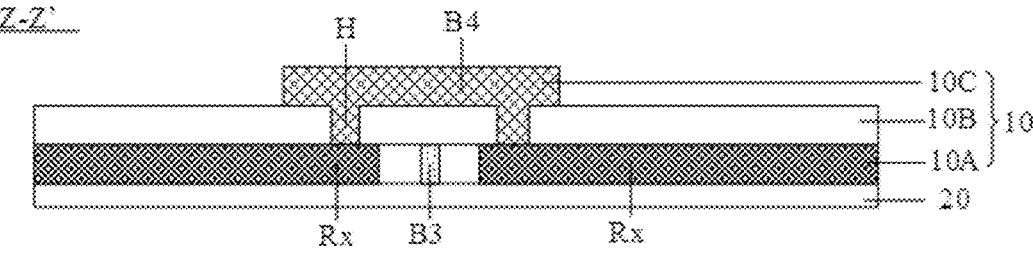
FIG. 20 is a sectional view taken along the section line Z-Z' in FIG. 19.

For example, as shown in FIG. 20, the third connection portion B3 is located in the first conductive layer 10A, and the fourth connection portion B4 is located in the second conductive layer 10C.

The third connection portion B3 and the first touch electrode Tx are integrally arranged. The insulating layer 10B is provided with via holes H therein, and the fourth connection portion B4 is electrically connected to the second touch electrodes Rx through the via holes H.

For example, the third connection portion B3 may be located in the second conductive layer 10C, and correspondingly the fourth connection portion B4 is located in the first conductive layer 10A.

The fourth connection portion B4 and the second touch electrode Rx are integrally arranged. The insulating layer 10B is provided with via holes H therein, and the third connection portion B3 is electrically connected to the first touch electrodes Tx through the via holes H.

For example, both the third connection portion B3 and the fourth connection portion B4 are both of a metal mesh structure.

Comparing FIG. 7 and FIG. 14, in a touch unit region J of the touch structure 10, the number of connection structures composed of the third connection portions B3 and the fourth connection portions B4 is greater than the number of connection structures in the related art. That is, there are a large number of metal lines GL, which may effectively reduce the resistance of the touch structure 10.

In some exemplary embodiments, referring to FIG. 17, the first touch channel 1 includes a plurality of first connection portions B1; in the same first touch channel 1, two first touch electrodes Tx adjacent in the second direction Y are electrically connected through the first connection portion B1. The second touch channel 2 further includes a second connection portion B2; in the same second touch channel 2, two second touch electrodes Rx adjacent in the first direction X are electrically connected through the second connection portion B2.

Referring to FIG. 17, at least one first connection portion B1 and at least one second connection portion B2 cross.

At the intersection of the first connection portion B1 and the second connection portion B2, the first connection portion B1 and the second connection portion B2 are separated by the insulating layer 10B, thereby achieving electrical connection of the touch electrodes in the same touch channel, avoiding the problem of crosstalk of the touch signals transmitted on the first touch electrodes Tx and the second touch electrodes Rx caused by the electrical conduction at the intersection.

For example, as shown in FIG. 18, the first connection portion B1 is located in the first conductive layer 10A, and the second connection portion B2 is located in the second conductive layer 10C.

The first connection portion B1 and the first touch electrodes Tx are integrally arranged. The insulating layer 10B is provided with via holes H therein, and the second connection portion B2 is electrically connected to the second touch electrodes Rx through the via holes H.

For example, the first connection portion B1 may be located in the second conductive layer 10C, and correspondingly the second connection portion B2 may be located in the first conductive layer 10A.

The second connection portion B2 and the second touch electrode Rx are integrally arranged. The insulating layer 10B is provided with via holes H, and the first connection portion B1 is electrically connected to the first touch electrodes Tx through the via holes H.

For example, both the first connection portion B1 and the second connection portion B2 are both a metal mesh structure.

For example, in the touch unit region J of the touch structure 10, the number of connection structures composed of the first connection portions B1 and the second connection portions B2 is greater than the number of connection structures in the related art. That is, there are many metal lines GL, which may effectively reduce the resistance of the touch structure 10.

Figure 21:
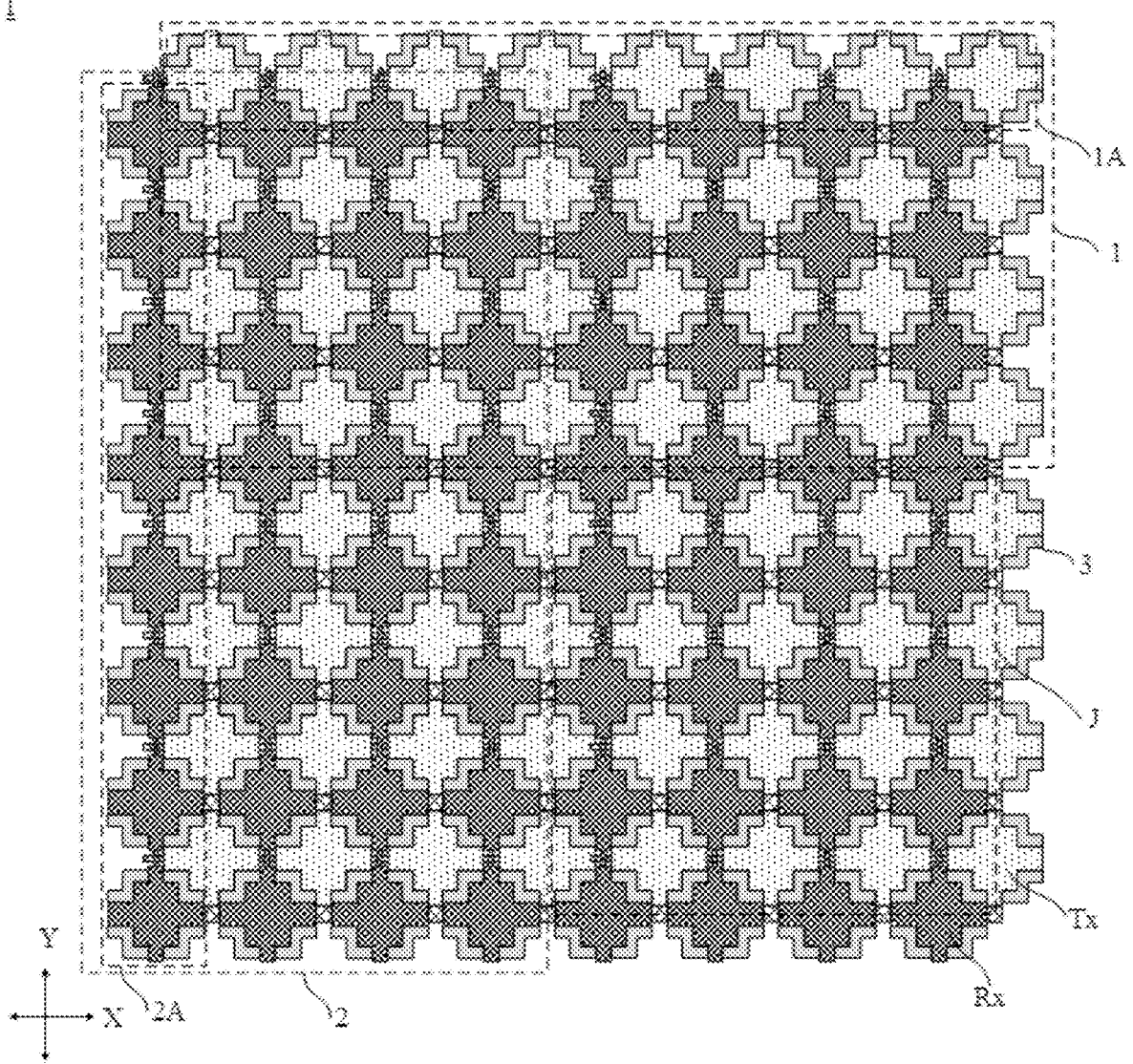
FIG. 21 is another enlarged view of a structure corresponding to the region where the dotted box I in FIG. 13 is located.

In some other embodiments, as shown in FIG. 21, the first touch channel 1 is located in a first rectangular region extending in the first direction X, and the second touch channel 2 is located in a second rectangular region extending in the second direction Y A rectangular region where the first rectangular region and the second rectangular region intersect is a touch unit region J.

Figure 22:
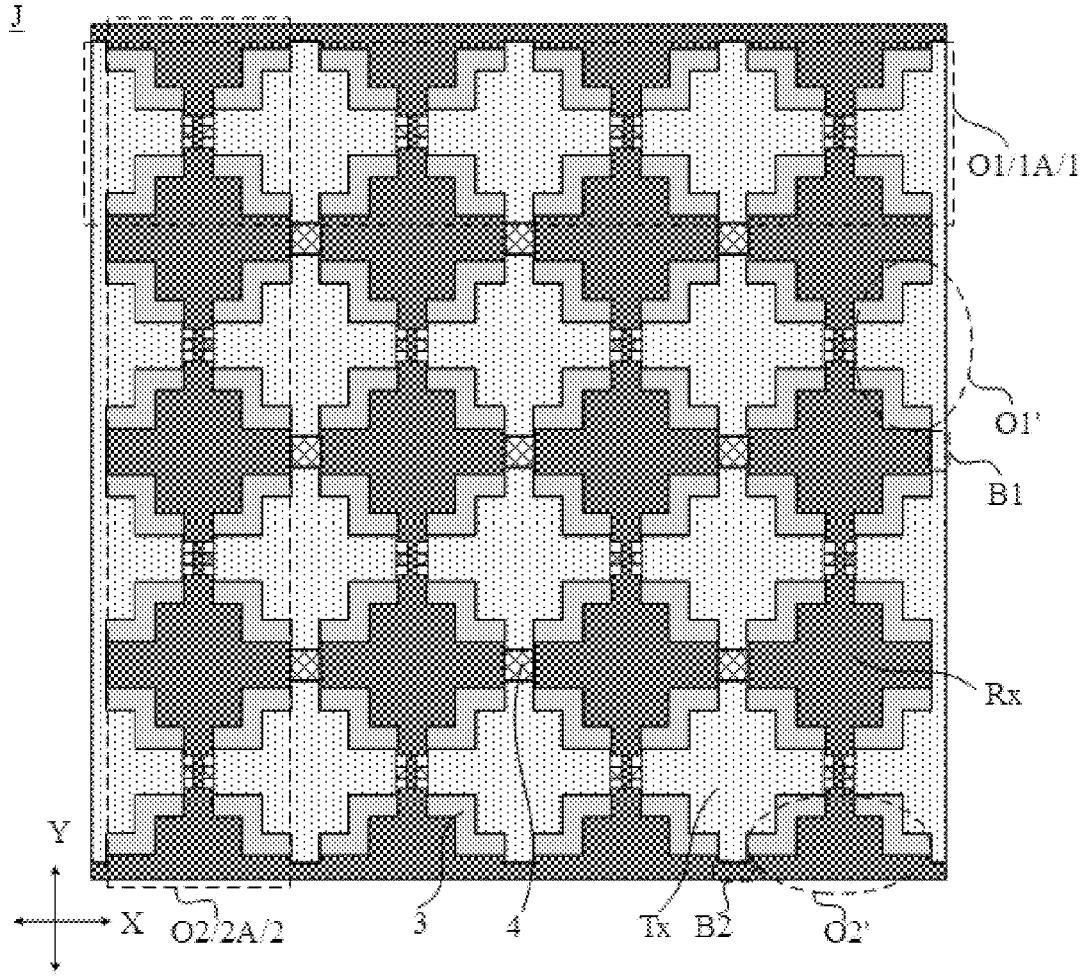
FIG. 22 is an enlarged view of a structure in a touch unit region in FIG. 21.

Referring to FIG. 22, a plurality of first electrode groups O1 and a plurality of second electrode groups O2 are provided in the touch unit region J. Each first electrode group O1 includes multiple first touch electrodes electrically connected in sequence in the first direction X, and each second electrode group O2 includes multiple second touch electrodes Rx electrically connected in sequence in the second direction Y The plurality of first electrode groups O1 belong to a plurality of first sub-channels 1A of the same first touch channel 1, and the plurality of second electrode groups O2 belong to a plurality of second sub-channels 2A of the same second touch channel 2.

That is, the plurality of first electrode groups O1 are parts of the first sub-channels 1A located in the touch unit region J, and the second electrode groups O2 are parts of the second sub-channels 2A located in the touch unit region J.

Referring to FIG. 22, multiple first touch electrodes Tx located on the same edge of the touch unit region J in the plurality of first electrode groups O1 are multiple first setting electrodes O1', and the multiple first setting electrodes O1' are connected in series in the second direction Y Multiple second touch electrodes Rx located on the same edge of the touch unit region J in the plurality of second electrode groups O2 are multiple second setting electrodes O2', and the multiple second setting electrodes O2' are connected in series in the first direction X.

For example, by removing the second dummy electrodes 4 at the edge of the touch unit region J, it is possible to achieve that the multiple first setting electrodes O1' may be connected in series in the second direction Y, and that the multiple second setting electrodes O2' may be connected in series in the first direction X.

It will be noted that in the touch unit region J, only half of the first setting electrode O1' and only half of the second setting electrode O2' are included.

The touch electrodes at the edge of the touch unit region J are electrically connected, so that the multiple sub-channels in the same touch channel are electrically connected, and the multiple sub-channels are electrically connected according to the division of the touch unit region J, so as to prevent the self-capacitance value of the display apparatus 1000 at different positions from varying greatly, for example, prevent the problem of different self-capacitance values in different touch unit regions J caused by arbitrary removal of the second dummy electrodes 4.

In some embodiments, as shown in FIG. 22, in a case where the display apparatus 1000 further includes a first connection portion B1 and a second connection portion B2, the plurality of first setting electrodes O1' are connected in series through the first connection portion B1, and the plurality of second setting electrodes O2' are connected in series through the second connection portion B2.

The first connection portion B1 and the second connection portion B2 are disposed in the same conductive layer. For example, the first connection portion B1 and the second connection portion B2 are both disposed in the first conductive layer 10A.

For example, referring to FIG. 22, the first connection portion B1 and the first setting electrode O1' are integrally formed, and the second connection portion B2 and the second setting electrode O2' may be integrally formed.

The inventors of the present disclosure analyzes the touch effects of the display apparatus 1000 provided by some embodiments of the present disclosure.

Experimental group: referring to FIG. 21, the display apparatus 1000 provided by the embodiments of the present disclosure includes first dummy electrodes 3, and a touch channel (including the first touch channel 1 or the second touch channel 2) includes a plurality of sub-channels (including the first sub-channel 1A and the second sub-channel 2A).

Control group: referring to FIG. 7, in the related art, a touch channel includes a sub-channel.

The analysis results are as follows.

TABLE 1

| | Control group | Experimental group |
| --- | --- | --- |
| Initial mutual capacitance value (pF) | 1.49 | 0.81 |
| Touch mutual capacitance value (pF) | 1.37 | 0.69 |
| Change amount of mutual capacitance (pF) | 0.12 | 0.12 |
| Proportion of change amount of mutual capacitance | 8.05% | 14.81% |

TABLE 1-continued

| | Control group | Experimental group |
| --- | --- | --- |
| Self-capacitance value of the first touch electrode (pF) | 9.23 | 7.504 |
| Self-capacitance value of the second touch electrode (pF) | 9.44 | 9.198 |
| Resistance of the first touch electrode (Ω) | 12.48 | 5.85 |
| Resistance of the second touch electrode (Ω) | 16.29 | 4.76 |

The term "initial mutual capacitance value" is the mutual capacitance value of the touch structure 10 when the finger does not touch the screen. The term "touch mutual capacitance value" is the mutual capacitance value of the touch structure 10 when the finger touches the screen. The term "change amount of mutual capacitance value" is the difference between the initial mutual capacitance value and the touch mutual capacitance value. The term "Proportion of change amount of mutual capacitance value" is the proportion of change amount of mutual capacitance value relative to the initial mutual capacitance value.

The higher the proportion of change amount of the mutual capacitance, the stronger the sensing capability of the touch structure 10 when the finger touches the screen, i.e., the higher the touch sensitivity of the touch structure 10, and the better the touch effect.

It can be seen from Table 1 that in the display apparatus 1000 provided by the embodiments of the present disclosure, in a case where the change amount of the mutual capacitance value remains unchanged, the initial mutual capacitance value is reduced, thereby increasing the proportion of the change amount of the mutual capacitance value, i.e., improving the touch sensitivity. Moreover, in the embodiments of the present disclosure, it is also possible to reduce the self-capacitance value of the touch electrode (including the parasitic capacitance generated by the touch electrode and the cathode layer), and effectively improve the signal-to-noise ratio of the active pen during the touch process to optimize the touch effect of the active pen. In addition, in the embodiments of the present disclosure, it is also possible to greatly reduce the resistance of the touch electrode, which may effectively reduce the attenuation of the signal transmitted by the active pen, and reduce the load of the touch structure 10, so as to further optimize the touch effect.

To sum up, in the display apparatus 1000 provided by the embodiments of the present disclosure, the initial mutual capacitance value, the self-capacitance value and the resistance value of the touch electrode are reduced, thereby greatly improving the performance such as sensitivity and signal-to-noise ratio of the active pen during the touch process to optimize the touch effect.

Figure 23:
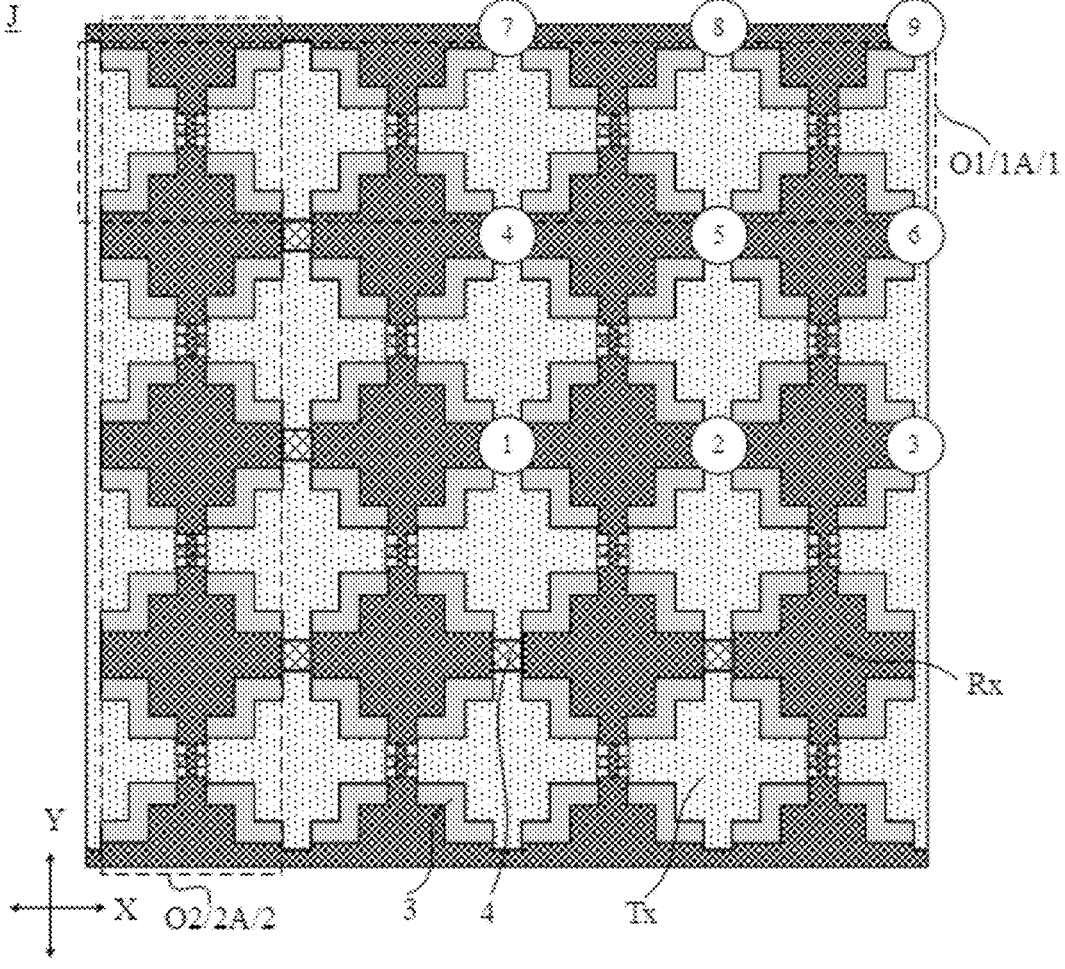
FIG. 23 is a distribution diagram of touch points in a touch unit region in FIG. 21.

Referring to FIG. 23, the inventors of the present disclosure analyzed the touch effects of the touch points (①~⑨) in the touch unit region J in Experimental group. During the analysis process, the touch points (①~⑨) corresponding to the display apparatus 1000' in the related art serve as Control group.

It will be noted that the size of the touch unit region J in Experimental group and the touch unit region J' in Control group are substantially the same.

The analysis results are as follows.

TABLE 2

| Touch points | Control group | | Experimental group | |
| --- | --- | --- | --- | --- |
| | F1(fF) | F2(fF) | F1(fF) | F2(fF) |
| ① | 37.98 | 21.41 | 30.26 | 30.14 |
| ② | 34.25 | 18.96 | 30.21 | 30.35 |
| ③ | 7.29 | 8.65 | 15.14 | 15.22 |
| ④ | 28.62 | 22.65 | 30.16 | 30.18 |
| ⑤ | 25.52 | 21.74 | 30.22 | 30.14 |
| ⑥ | 9.14 | 7.88 | 15.09 | 15.11 |
| ⑦ | 7.56 | 6.95 | 14.95 | 15.15 |
| ⑧ | 6.45 | 6.87 | 15.11 | 15.21 |
| ⑨ | 2.01 | 1.29 | 7.62 | 7.58 |

"F1" is the coupling capacitance between the active pen and the first touch electrode Tx when the active pen touches the touch point in the display apparatus 1000, and "F2" is the coupling capacitance between the active pen and the second touch electrode Rx when the active pen touches the touch point in the display apparatus 1000.

Referring to Table 2, in the related art (i.e., Control group), at different locations, such as Touch point ① and Touch point ②, the coupling capacitance between the active pen and the touch electrode varies greatly. In addition, at the same position, the coupling capacitance between the first touch electrode Tx and the active pen is significantly different from the coupling capacitance between the second touch electrode Rx and the active pen, resulting in poor linearity of the active pen during the touch process. Moreover, the attenuation of the signal transmitted by the active pen at different touch points is also different, resulting in different floating heights of the active pen at different positions, which will affect the touch experience.

It can be seen from Table 2 that in the display apparatus 1000 provided by the embodiments of the present disclosure, the coupling capacitance between the active pen and the touch electrode is substantially the same at, for example, Touch point ① and Touch point ②; the difference between the coupling capacitances of the active pen and the touch electrode also decreases at, for example, Touch points ② and Touch point ③; at the same position, such as Touch point ①, the coupling capacitance between the first touch electrode Tx and the active pen is substantially the same as the coupling capacitance between the second touch electrode Rx and the active pen.

To sum up, for the display apparatus 1000 provided by the embodiments of the present disclosure, it is possible to effectively improve the linearity of the active pen during the touch process, and also make the signal amount of the active pen at different positions substantially uniform and the floating height substantially uniform, thereby improving the touch experience of the active pen.

Figure 24:
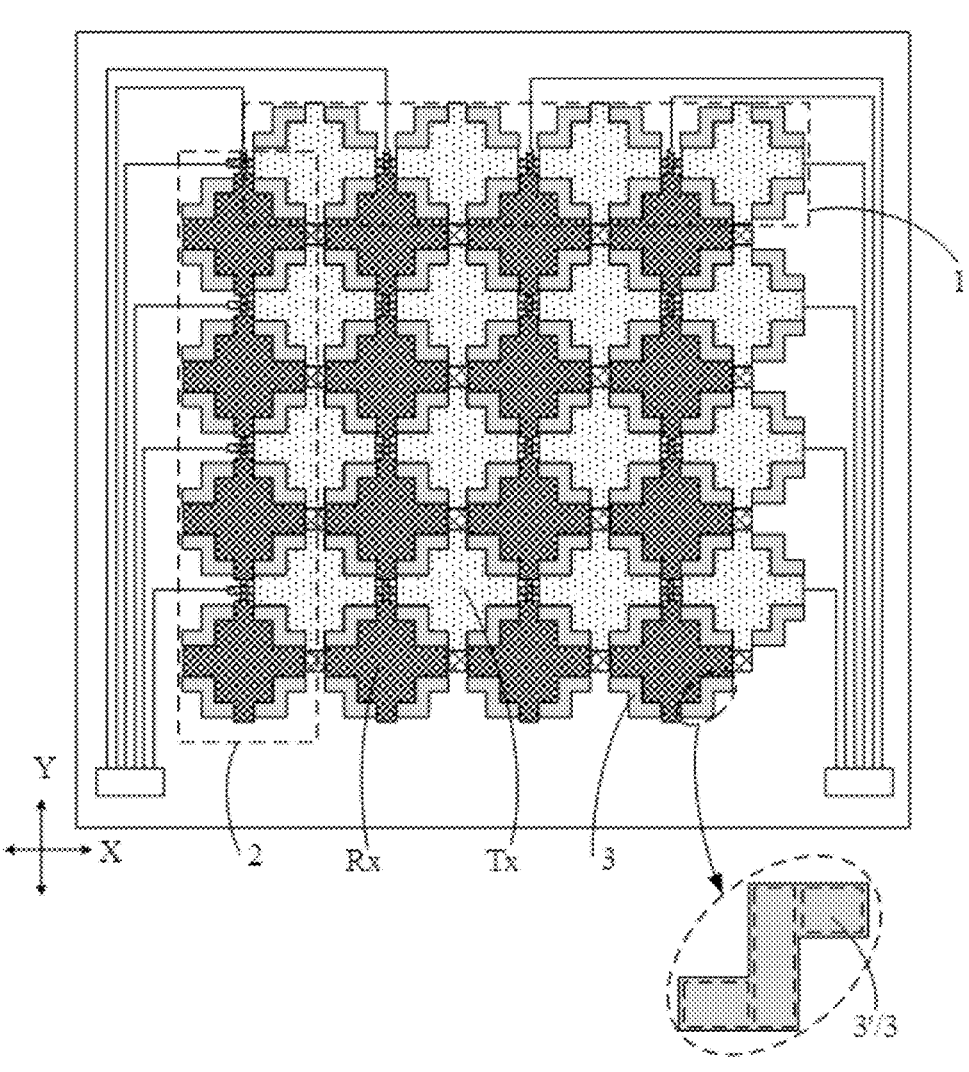
FIG. 24 is a top view of another touch structure, in accordance with some embodiments.

The embodiments of the present disclosure provide a touch structure 10. As shown in FIG. 24, the touch structure 10 includes a plurality of first touch channels 1, a plurality of second touch channels 2 and first dummy electrodes 3.

Among the plurality of first touch channels 1, each first touch channel 1 extends in a first direction X; each first touch channel 1 includes a plurality of first touch electrodes Tx arranged in sequence in the first direction X, and two adjacent first touch electrodes Tx are electrically connected.

Among the plurality of second touch channels 2, each second touch channel 2 extends in a second direction Y; each second touch channel 2 includes a plurality of second touch electrodes Rx arranged in sequence in the second direction Y, and two adjacent second touch electrodes Rx are electrically connected.

The first touch electrodes 1 and the second touch electrodes 2 intersect with and are insulated from each other, so that the first touch electrode Tx and the second touch electrode Rx are insulated from each other.

The first direction X and the second direction Y intersect with each other. For example, the first direction X and the second direction Y are perpendicular to each other.

For example, the touch structure 10 includes a plurality of metal lines GL, and the plurality of metal lines GL intersect with each other to form a plurality of metal meshes G.

Referring to FIG. 24, the first dummy electrode 3 is disposed between the adjacent first touch electrode Tx and the second touch electrode Rx, and is insulated from the first touch electrode Tx and the second touch electrode Rx.

For example, the first touch electrode Tx, the second touch electrode Rx and the first dummy electrode 3 are all of a metal mesh structure.

Referring to FIG. 24, a border of the first dummy electrode 3 proximate to the first touch electrode Tx and a border of the first dummy electrode 3 proximate to the second touch electrode Rx are each in a shape of a zigzag, the borders of the first dummy electrode 3 and the first touch electrode Tx proximate to each other match to each other in shape, and the borders of the first dummy electrode 3 and the second touch electrode Rx proximate to each other match to each other in shape.

That is, a shape of a gap between the first touch electrode Tx and the second touch electrode Rx matches a shape of the first dummy electrode 3. For example, the gap between the first touch electrode Tx and the second touch electrode Rx is substantially filled with first dummy electrode 3.

By providing the first dummy electrode 3 and setting the border of the first dummy electrode 3 to match the border of the touch electrode (including the first touch electrode Tx or the second touch electrode Rx) proximate to the first dummy electrode 3, so that the gap between the first touch electrode Tx and the second touch electrode Rx is substantially filled with first dummy electrode 3. Thus, it is possible to reduce the areas of the first touch electrode Tx and the second touch electrode Rx while the size of the entire screen of the touch structure 10 remains unchanged to reduce the initial mutual capacitance value of the entire touch structure 10 (the mutual capacitance value of the touch structure 10 when the finger is not touching), thereby improving the touch sensitivity of the touch structure 10 to optimize the touch effect. In addition, it is possible to reduce the heat generated by the touch structure 10, thereby preventing the display apparatus 1000 from suffering great losses due to temperature changes. For example, it may be possible to prevent the problem of ghost points caused by the large temperature changes of certain materials of the display apparatus 1000, such as the polarizer 500 and other structures. In addition, reducing the area of the touch electrode may reduce the parasitic capacitance between the touch electrode and the cathode layer 304, thereby improving the signal-to-noise ratio of the active pen and further optimizing the touch effect of the active pen.

In some embodiments, as shown in FIG. 24, the first dummy electrode 3 includes a plurality of extension portions 3' connected in sequence, each extension portion 3' is in a shape of a strip, and extension directions of any two adjacent extension portions 3' intersect.

For example, as shown in FIG. 24, the first dummy electrode 3 is in a shape of "Z".

By providing the plurality of strip-shaped extension portions 3', and setting the extension directions of any two adjacent extension portions 3' to intersect, the first dummy electrode 3 is in a shape of a zigzag as a whole, so that the borders formed after the metal lines GL between the first dummy electrode 3 and the first touch electrode are disconnected are relatively jagged. Thus, it is possible to avoid the problem of obvious line marks appearing between the first dummy electrode 3 and the touch electrode caused by disconnecting the lines in a straight line with a long distance; i.e., avoid the problem of shadowing in the display process of the display apparatus 1000, thereby improving the display effect of the display apparatus 1000.

In some embodiments, as shown in FIG. 24, four first dummy electrodes 3 are arranged around the first touch electrode Tx, and the four first dummy electrodes 3 are symmetrically arranged with respect to a center of the first touch electrode Tx; four first dummy electrodes 3 are arranged around the second touch electrode Rx, and the four first dummy electrodes 3 are symmetrically arranged with respect to a center of the second touch electrode Rx.

According to the above embodiments, the shapes of the first touch electrode Tx and the second touch electrode Rx and the areas of the first touch electrode Tx and the second touch electrode Rx may be made substantially the same, so that the noise signals of the touch structure 10 at different positions are substantially the same. Thus the signal-to-noise ratio of the active pen at different positions of the touch structure 10 during the touch process is substantially the same, which may improve the touch performance of the active pen, for example, make the floating height of the active pen uniform.

Figure 25:
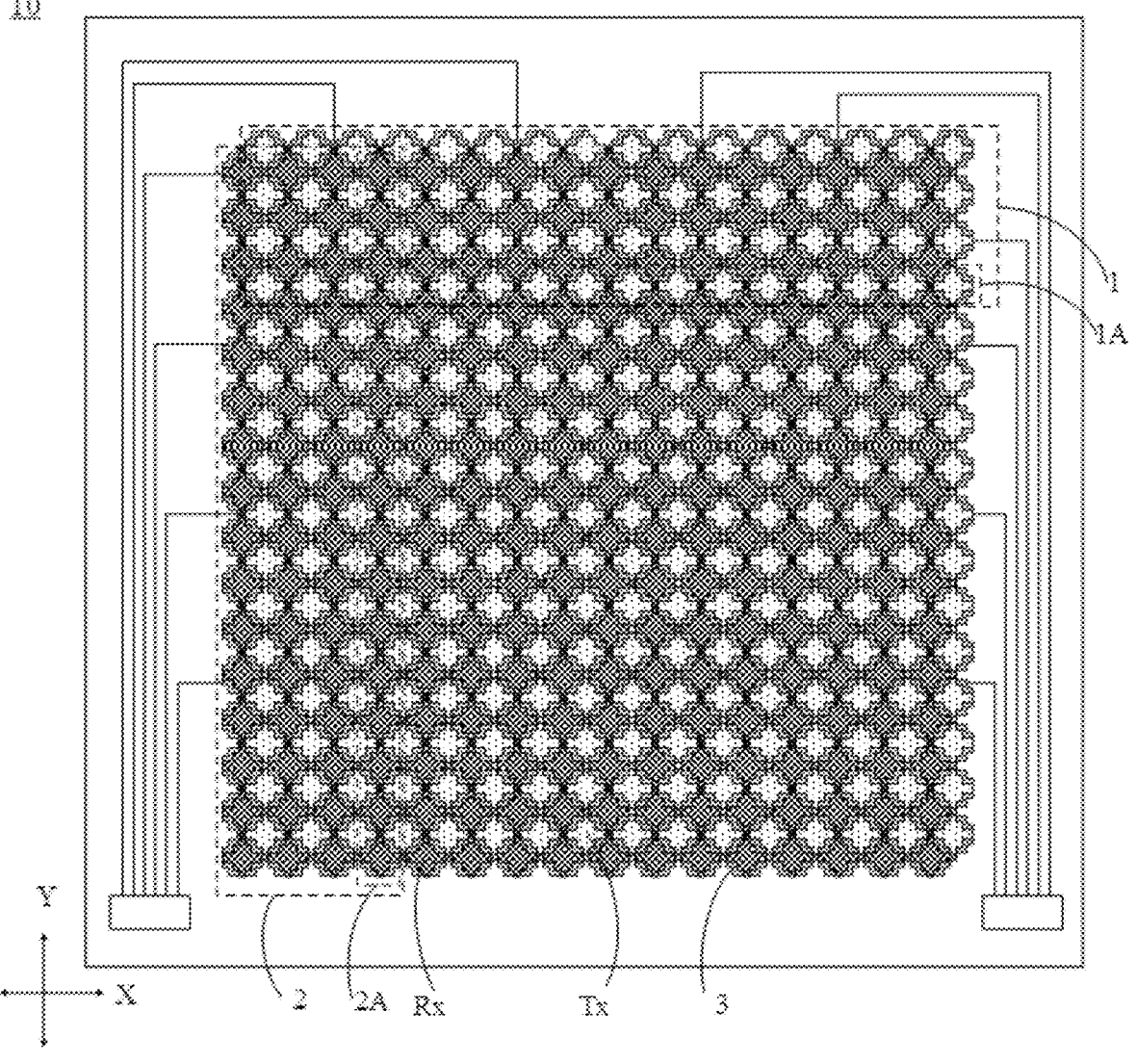
FIG. 25 is a top view of yet another touch structure, in accordance with some embodiments.

In some embodiments, as shown in FIG. 25, at least one first touch channel 1 includes a plurality of first sub-channels 1A; the plurality of first sub-channels 1A are arranged in the second direction Y, and each first sub-channel 1A extends in the first direction X; the first sub-channel 1A includes multiple first touch electrodes Tx that are electrically connected. For example, referring to FIG. 25, a first touch channel 1 includes four first sub-channels 1.

As shown in FIG. 25, at least one second touch channel 2 includes a plurality of second sub-channels 2A; the plurality of second sub-channels 2A are arranged in the first direction X, and each second sub-channel 2A extends in the second direction Y; the second sub-channel 2A includes multiple second touch electrodes Rx that are electrically connected. For example, referring to FIG. 25, a second touch channel 2 includes four second sub-channels 2A.

Based on the above embodiments, the plurality of first sub-channels 1A included in the same first touch channel 1 are electrically connected, and the plurality of second sub-channels 2A included in the same second touch channel 2 are electrically connected.

By providing multiple adjacent sub-touch channels (including the first sub-channels 1A and the second sub-channels 2A) in at least one touch channel (including the first touch channel 1 or the second touch channel 2), and setting the multiple sub-touch channels in the same touch channel to be electrically connected, the area of the touch unit area J in the touch structure 10 is not changed, it is possible to ensure the compatibility between the finger touch and the display apparatus 1000 without changing the area of the touch unit region J in the touch structure 10, and moreover, the touch unit region J is divided into a plurality of touch points M1 that match the size of tip of the active pen, which greatly improves the accuracy of the active pen and ensures the touch function of active pen in display apparatus 1000. Furthermore, it is also possible to effectively improve the linearity of the active pen during the touch process, and also make the signal amount of the active pen at different positions substantially uniform and the floating height substantially uniform, thereby improving the touch experience of the active pen.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A display apparatus, comprising: a touch region, and a fan-out region, a first peripheral region, a second peripheral region and a third peripheral region that together surround the touch region, wherein the first peripheral region and the second peripheral region are respectively located on two sides of the touch region in a first direction, and the fan-out region and the third peripheral region are respectively located on two sides of the touch region in a second direction; the first direction and the second direction intersect with each other; and the touch region includes a first sub-region, a second sub-region, a third sub-region and a fourth sub-region, the first sub-region and the second sub-region are arranged in the first direction, and the first sub-region and the third sub-region are arranged in the second direction, and the third sub-region and the fourth sub-region are arranged in the first direction;

the display apparatus comprising:

a plurality of first touch channels and a plurality of second touch channels disposed in the touch region, wherein each first touch channel includes a plurality of first touch electrodes arranged in the first direction and connected in series, and each second touch channel includes a plurality of second touch electrodes arranged in the second direction and connected in series; at least one first touch channel and at least one second touch channel are arranged in each sub-region, and the at least one first touch channel and the at least one second touch channel are arranged crosswise and insulated from each other; first touch channels located in different sub-regions are insulated from each other, and second touch channels located in different sub-regions are insulated from each other;

a plurality of first touch traces electrically connected to the plurality of first touch channels; wherein first touch traces connected to first touch channels in the first sub-region and the third sub-region extend from the first peripheral region to the fan-out region; first touch traces connected to first touch channel in the second sub-region and the fourth sub-region extend from the second peripheral region to the fan-out region;

a plurality of second touch traces electrically connected to the plurality of second touch channels; wherein second touch traces connected to second touch channels in the first sub-region are led out from the third peripheral region and extend to the fan-out region passing through the first peripheral region; second touch traces connected to second touch channels in the second sub-region are led out from the third peripheral region and extend to the fan-out region passing through the second peripheral region; second touch traces electrically connected to second touch channels in the third sub-region and the fourth sub-region directly extend to the fan-out region;

a first touch chip and a second touch chip; wherein in any two sub-regions, first touch traces connected to first touch channels and second touch traces connected to second touch channels are electrically connected to the first touch chip; in remaining two sub-regions except for the any two sub-regions, first touch traces connected to first touch channels and second touch traces connected to second touch channels are electrically connected to the second touch chip;

first dummy electrodes, wherein a first dummy electrode is disposed between adjacent first touch electrode and second touch electrode and insulated from the first touch electrode and the second touch electrode; and second dummy electrodes, wherein a second dummy electrode is disposed between two adjacent first touch electrodes that belong to different first touch channels and between two adjacent second touch electrodes that belong to different second touch channels; the second dummy electrode is insulated from the two adjacent first touch electrodes and the two adjacent second touch electrodes; and the second dummy electrode is connected to the first dummy electrode.

2. The display apparatus according to claim 1, wherein dimensions of the first touch channels located in different sub-regions in the first direction are substantially equal, and dimensions of the second touch channels located in different sub-regions in the second direction are substantially equal.

3. The display apparatus according to claim 1, wherein the first touch channels located in different sub-regions include an equal number of first touch electrodes, and the second touch channels located in different sub-regions include an equal number of second touch electrodes.

4. The display apparatus according to claim 1, wherein centers of two adjacent first touch channels that are respectively located in the first sub-region and the second sub-region are located substantially on a same straight line extending in the first direction, and centers of two adjacent first touch channels that are respectively located in the third sub-region and the fourth sub-region are located substantially on a same straight line extending in the first direction; and centers of two adjacent second touch channels that are respectively located in the first sub-region and the third sub-region are substantially located on a same straight line extending in the second direction, and centers of two adjacent second touch channels that are respectively located in the second sub-region and the fourth sub-region are substantially on a same straight line extending in the second direction.

5. The display apparatus according to claim 4, wherein two first touch channels that belong to different sub-regions and are adjacently arranged in the first direction have a gap therebetween, and two second touch channels that belong to different sub-regions and adjacently arranged in the second direction have a gap therebetween, and the gap extends in a shape of zigzag.

6. The display apparatus according to claim 1, wherein in the first sub-region and the second sub-region, first touch traces connected to first touch channels and second touch traces connected to second touch channels are electrically connected to the first touch chip; and in the third sub-region and the fourth sub-region, first touch traces connected to the first touch channels and second touch traces connected to second touch channels are electrically connected to the second touch chip.

7. The display apparatus according to claim 6, wherein the first touch chip and the second touch chip are both disposed on a side of the fan-out region away from the third peripheral region; in the second direction, the second touch chip is closer to the fan-out region than the first touch chip.

8. The display apparatus according to claim 1, wherein a part of first touch traces located in the first peripheral region is arranged closer to the touch region than a part of second touch traces located in the first peripheral region; a part of first touch traces located in the second peripheral region is arranged closer to the touch region than a part of second touch traces located in the second peripheral region.

9. The display apparatus according to claim 1, wherein a border of the first dummy electrode proximate to the first touch electrode and a border of the first dummy electrode proximate to the second touch electrode are both in a shape of zigzag; borders of the first dummy electrode and the first touch electrode that are close to each other match to each other in shape, and borders of the first dummy electrode and the second touch electrode that are close to each other match to each other in shape.

10. The display apparatus according to claim 9, wherein the first dummy electrode is in a shape of a center symmetric pattern; or the first dummy electrode is in a shape of a center symmetric pattern, a midpoint of a connection line between a center of the first touch electrode adjacent to the first dummy electrode and a center of the second touch electrode adjacent to the first dummy electrode coincides with a center of the first dummy electrode.

11. The display apparatus according to claim 9, wherein the first dummy electrode includes a plurality of extension portions connected in sequence, and each extension portion is in a shape of a strip; extension directions of any two adjacent extension portions intersect; or the first dummy electrode includes a plurality of extension portions connected in sequence, and each extension portion is in a shape of a strip; extension directions of any two adjacent extension portions intersect; the first dummy electrode includes a first extension portion, and two second extension portions respectively located at two ends of the first extension portion and connected to the first extension portion; the first extension portion extends substantially in the second direction, and the second extension portions each extend substantially in the first direction.

12. The display apparatus according to claim 9, wherein the first dummy electrode is in a shape of a strip, and a width of the first dummy electrode at different positions in a length direction of the first dummy electrode is substantially equal.

13. The display apparatus according to claim 9, wherein four first dummy electrodes of all the first dummy electrodes are arranged around the first touch electrode, and the four first dummy electrodes are centrally symmetrically arranged with respect to a center of the first touch electrode; and four first dummy electrodes of all the first dummy electrodes are arranged around the second touch electrode, and the four first dummy electrodes are centrally symmetrically arranged with respect to a center of the second touch electrode; and/or the first touch electrode and the second touch electrode each include a main body, two first protruding portions, and two second protruding portions; the main body portion is in a shape of a rectangle, the two first protruding portions are disposed on two sides of the main body portion in the first direction, and the two second protruding portions are disposed on two sides of the main body portion in the second direction; the two first protruding portions and the two second protruding portions are all connected to the main body portion.

14. The display apparatus according to claim 1, wherein the at least one first touch channel includes a plurality of first sub-channels, and the plurality of first sub-channels are arranged in the second direction; each first sub-channel extends in the first direction, and the first sub-channel includes multiple first touch electrodes that are electrically connected; first sub-channels included in a same first touch channel are electrical connected; and/or the at least one second touch channel includes a plurality of second sub-channels, and the plurality of second sub-channels are arranged in the first direction; each second sub-channel extends in the second direction, and the second sub-channel includes multiple second touch electrodes that are electrically connected; second sub-channels included in a same second touch channel are electrically connected.

15. The display apparatus according to claim 14, wherein in a same first touch channel, two first touch electrodes adjacent in the second direction in at least one pair are electrically connected; and/or in a same second touch channel, two second touch electrodes adjacent in the first direction in at least one pair are electrically connected.

16. The display apparatus according to claim 14, wherein the at least one first touch channel further includes first connection portions; in a same first touch channel, first touch electrodes adjacent in the second direction in at least one pair are electrically connected through a first connection portion; and/or the at least one second touch channel further includes second connection portions; in a same second touch channel, second touch electrodes adjacent in the first direction in at least one pair are electrically connected through a second connection portion.

17. The display apparatus according to claim 14, wherein a first touch channel of the plurality of first touch channels is located in a first rectangular region extending in the first direction, and a second touch channel of the plurality of second touch channels is located in a second rectangular region in the second direction; and a rectangular region where the first rectangular region and the second rectangular region intersect is a touch unit region;

the touch unit region is provided with a plurality of first electrode groups and a plurality of second electrode groups therein, each first electrode group includes multiple first touch electrodes electrically connected in sequence in the first direction, and each second electrode group includes multiple second touch electrodes electrically connected in sequence in the second direction; the plurality of first electrode groups belong to a plurality of first sub-channels of a same first touch channel, and the plurality of second electrode groups belong to a plurality of second sub-channels of a same second touch channel; wherein multiple first touch electrodes located on a same edge of the touch unit region in the plurality of first electrode groups are multiple first setting electrodes, and the multiple first setting electrodes are connected in series in the second direction; and multiple second touch electrodes located on a same edge of the touch unit region in the plurality of second electrode groups are multiple second setting electrodes, and the multiple second setting electrodes are connected in series in the first direction.

18. A touch structure, comprising:

a plurality of first touch channels, wherein each first touch channel extends in a first direction, each first touch channel includes a plurality of first touch electrodes arranged in sequence in the first direction, and two adjacent first touch electrodes are electrically connected;

a plurality of second touch channels, wherein each second touch channel extends in a second direction, each second touch channel includes a plurality of second touch electrodes arranged in sequence in the second direction, and two adjacent second touch electrodes are electrically connected; the first touch channels and the second touch channels intersect with each other and are insulated from each other; the first direction and the second direction intersect with each other; and first dummy electrodes, wherein a first dummy electrode is disposed between adjacent first touch electrode and second touch electrode, and is insulated from the first touch electrode and the second touch electrode; a border of the first dummy electrode proximate to the first touch electrode and a border of the first dummy electrode proximate to the second touch electrode are each in a shape of a zigzag, borders of the first dummy electrode and the first touch electrode proximate to each other match to each other in shape, and borders of the first dummy electrode and the second touch electrode proximate to each other match to each other in shape; and second dummy electrodes, wherein a second dummy electrode is disposed between two adjacent first touch electrodes that belong to different first touch channels and between two adjacent second touch electrodes that belong to different second touch channels; the second dummy electrode is insulated from the two adjacent first touch electrodes and the two adjacent second touch electrodes; and the second dummy electrode is connected to the first dummy electrode.

19. The touch structure according to claim 18, wherein the first dummy electrode includes a plurality of extension portions connected in sequence, each extension portion is in a shape of a strip, and extension directions of any two adjacent extension portions intersect; and/or four first dummy electrodes of all the first dummy electrodes are arranged around the first touch electrode, and the four first dummy electrodes are centrally symmetrically arranged with respect to a center of the first touch electrode; four first dummy electrodes of all the first dummy electrodes are arranged around the second touch electrode, and the four first dummy electrodes are centrally symmetrically arranged with respect to a center of the second touch electrode.

* * * * *